United States Patent
Terashima

(10) Patent No.: US 11,204,505 B2
(45) Date of Patent: Dec. 21, 2021

(54) HEAD-MOUNTED DISPLAY APPARATUS AND COVER MEMBER

(71) Applicant: SEIKO EPSON CORPORATION, Tokyo (JP)

(72) Inventor: Yasuhiro Terashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/583,432

(22) Filed: Sep. 26, 2019

(65) Prior Publication Data

US 2020/0103663 A1    Apr. 2, 2020

(30) Foreign Application Priority Data

Sep. 27, 2018   (JP) ............................. JP2018-182319

(51) Int. Cl.
  *G02B 27/01*    (2006.01)
  *G02C 5/00*     (2006.01)

(52) U.S. Cl.
  CPC ..... *G02B 27/0176* (2013.01); *G02B 27/0172* (2013.01); *G02B 27/0179* (2013.01); *G02C 5/001* (2013.01); *G02B 2027/0178* (2013.01); *G02B 2027/0187* (2013.01)

(58) Field of Classification Search
  CPC .. G02B 27/017; G02B 27/0176; G02B 27/01; G06F 3/012
  See application file for complete search history.

(56) References Cited

U.S. PATENT DOCUMENTS

| 2015/0205132 A1* | 7/2015 | Osterhout | G02B 27/0093 345/633 |
| 2016/0227868 A1* | 8/2016 | Mullins | A42B 3/221 |
| 2018/0224625 A1* | 8/2018 | Tseng | H04M 1/0264 |

FOREIGN PATENT DOCUMENTS

WO    2016/133886 A1    8/2016

* cited by examiner

*Primary Examiner* — Dennis P Joseph
(74) *Attorney, Agent, or Firm* — Oliff PLC

(57) ABSTRACT

A head-mounted display apparatus includes a display unit, a support portion configured to support the display unit, and a cover member is removably provided to the support portion. The cover member includes a contact portion that is positioned on a facing surface facing the support portion and that comes into contact with the support portion, and a first protruding portion that is positioned on the facing surface and that protrudes toward the support portion to be inserted into the support portion. At least one of the cover member and the support portion includes a magnet that attracts the other one by a magnetic force. The contact portion and the first protruding portion are provided on an inner side with respect to an outer edge of the cover member when the cover member is viewed in the direction opposite to the first direction.

12 Claims, 19 Drawing Sheets

HEAD-MOUNTED DISPLAY APPARATUS AND COVER MEMBER

The present application is based on, and claims priority from JP Application Serial Number 2018-182319, filed Sep. 27, 2018, the disclosure of which is hereby incorporated by reference herein in its entirety.

BACKGROUND

1. Technical Field

The present disclosure relates to a head-mounted display apparatus and a cover member.

2. Related Art

A head-mounted display apparatus that is mounted on a head of a user and displays an image visually recognizable by the user has hitherto been known. As such head-mounted display apparatus, a head-mounted computer with a mountable eye cover has been known (for example, see WO 2016/133886).

The head-mounted computer described in WO 2016/133886 holds a lens by a magnet so as to facilitate removal and replacement of the lens.

Incidentally, an attracting force of the magnet acts strongly in a direction vertical to an attractive surface, but does not act very strongly in a direction parallel to the attractive surface. That is, when an attaching target is removably attached to an attaching portion with the magnet provided to the attaching portion, the attaching target cannot be moved easily in the direction vertical to the attractive surface of the magnet, but the attaching target can be moved easily in the direction parallel to the attractive surface of the magnet.

Thus, as in the head-mounted computer described in WO 2016/133886, in a case where the attaching target such as a lens is held by the magnet provided to a casing, when the attaching target is shifted in parallel to the attractive surface of the magnet, there is a problem in that the attaching target is liable to come off the casing.

In response to this problem, it is conceivable to intensify the attracting force of the magnet. However, in this case, there is a problem in that the attaching target is hard to remove from the attaching portion.

SUMMARY

A head-mounted display apparatus according to a first aspect of the present disclosure is a head-mounted display apparatus to be mounted on a head of a user, the head-mounted display apparatus including a display unit configured to display an image by emitting image light in a first direction to a predetermined viewing position, a support portion configured to support the display unit, and a cover member that is positioned with respect to the display unit in a direction opposite to the first direction and that is removably provided to the support portion, wherein the cover member includes a contact portion that is positioned on a facing surface facing the support portion and that comes into contact with the support portion, and a first protruding portion that is positioned on the facing surface and that protrudes toward the support portion to be inserted into the support portion, at least one of the cover member and the support portion includes a magnet that attracts the other one of the cover member and the support portion by a magnetic force, and the contact portion and the first protruding portion are provided on an inner side with respect to an outer edge of the cover member when the cover member is viewed from the direction opposite to the first direction.

In the first aspect described above, the display unit may include an image emitting unit configured to emit the image light and a light-guiding portion configured to guide the image light emitted by the image emitting unit to the viewing position, the support portion may include a frame portion positioned on the cover member side with respect to the light-guiding portion and surrounding a display position of the image formed by the image light guided by the light-guiding portion, and the first protruding portion may be arranged to be configured to abut an inner end edge of the frame portion.

In the first aspect described above, the first protruding portion may be arranged to be configured to abut two portions of the inner end edge of the frame portion, the portions intersecting each other.

In the first aspect described above, the first protruding portion may have a protruding dimension that prevents contact with the light-guiding portion.

In the first aspect described above, the cover member may include a restriction portion that is positioned, on the facing surface, on an arrangement side of the first protruding portion with respect to the contact portion and that comes into contact with the support portion to restrict the first protruding portion from coming into contact with the light-guiding portion.

In the first aspect described above, the light-guiding portion may include a right-side light-guiding portion provided correspondingly to a right eye of the user and a left-side light-guiding portion provided correspondingly to a left eye of the user, the frame portion may include a right-side frame portion provided correspondingly to the right-side light-guiding portion and a left-side frame portion provided correspondingly to the left-side light-guiding portion, the cover member may include a second protruding portion that is provided on an inner side with respect to an outer edge of the cover member when the cover member is viewed from the direction opposite to the first direction and that is configured to abut a portion between the right-side frame portion and the left-side frame portion, and the first protruding portion may be provided correspondingly to one of two corner portions, positioned on a side opposite to the left-side frame portion, among corner portions of an inner end edge of the right-side frame portion and to one of two corner portions, positioned on a side opposite to the right-side frame portion, among corner portions of an inner end edge of the left-side frame portion.

In the first aspect described above, the light-guiding portion may include a right-side light-guiding portion provided correspondingly to a right eye of the user and a left-side light-guiding portion provided correspondingly to a left eye of the user, the frame portion may include a right-side frame portion provided correspondingly to the right-side light-guiding portion and a left-side frame portion provided correspondingly to the left-side light-guiding portion, and the first protruding portion may be provided correspondingly to two corner portions, positioned on a side opposite to the left-side frame portion, among corner portions of an inner end edge of the right-side frame portion and to two corner portions, positioned on a side opposite to the right-side frame portion, among corner portions of an inner end edge of the left-side frame portion.

In the first aspect described above, the light-guiding portion may have a transmission property of transmitting incident light from a side of the cover member that covers the light-guiding portion and the cover member may have a transmission suppression property of suppressing transmission of incident light.

In the first aspect described above, the support portion may include a support portion-side first magnet and a support portion-side second magnet provided separate from each other, the cover member may include a cover-side first magnet that attracts and is attracted to the support portion-side first magnet and a cover-side second magnet that attracts and is attracted to the support portion-side second magnet, and a magnetic pole on a surface, facing the cover member, of the support portion-side first magnet and a magnetic pole on a surface, facing the cover member, of the support portion-side second magnet may be different from each other.

In the first aspect described above, the support portion may include support-portion side magnets respectively including, on respective surfaces thereof facing the cover member, regions with different magnetic poles, and the cover member may include cover-side magnets respectively including regions corresponding to the magnetic poles of the support portion-side magnets.

In the first aspect described above, the support portion may include the magnet and a yoke configured to intensify an attracting force by the magnetic force.

In the first aspect described above, the cover member may include a right-side region corresponding to a right eye of the user and a left-side region corresponding to a left eye of the user, and the right-side region and the left-side region may incline to the support portion side as distanced away from each other.

In the first aspect described above, a crossing angle formed by the right-side region and the left-side region may be less than 170 degrees.

A cover member according to a second aspect of the present disclosure is a cover member removably provided to a support portion of a head-mounted display apparatus including the support portion to which a display unit configured to display an image by emitting image light is provided, the cover member including a contact portion configured to come into contact with the support portion, a protruding portion that protrudes toward the support portion to be inserted into the support portion, and any one of a magnet attracting the support portion by a magnetic force and a magnetic body attracted to the support portion by a magnetic force, wherein the contact portion and the protruding portion are provided on an inner side with respect to an outer edge of the cover member when the cover member is viewed from a side opposite to a side on which the display unit emits the image light.

DESCRIPTION OF EXEMPLARY EMBODIMENTS

First Exemplary Embodiment

First Exemplary Embodiment of the present disclosure will be described below with reference to the drawings.

Schematic Configuration of Head-Mounted Display Apparatus

Figure 1:
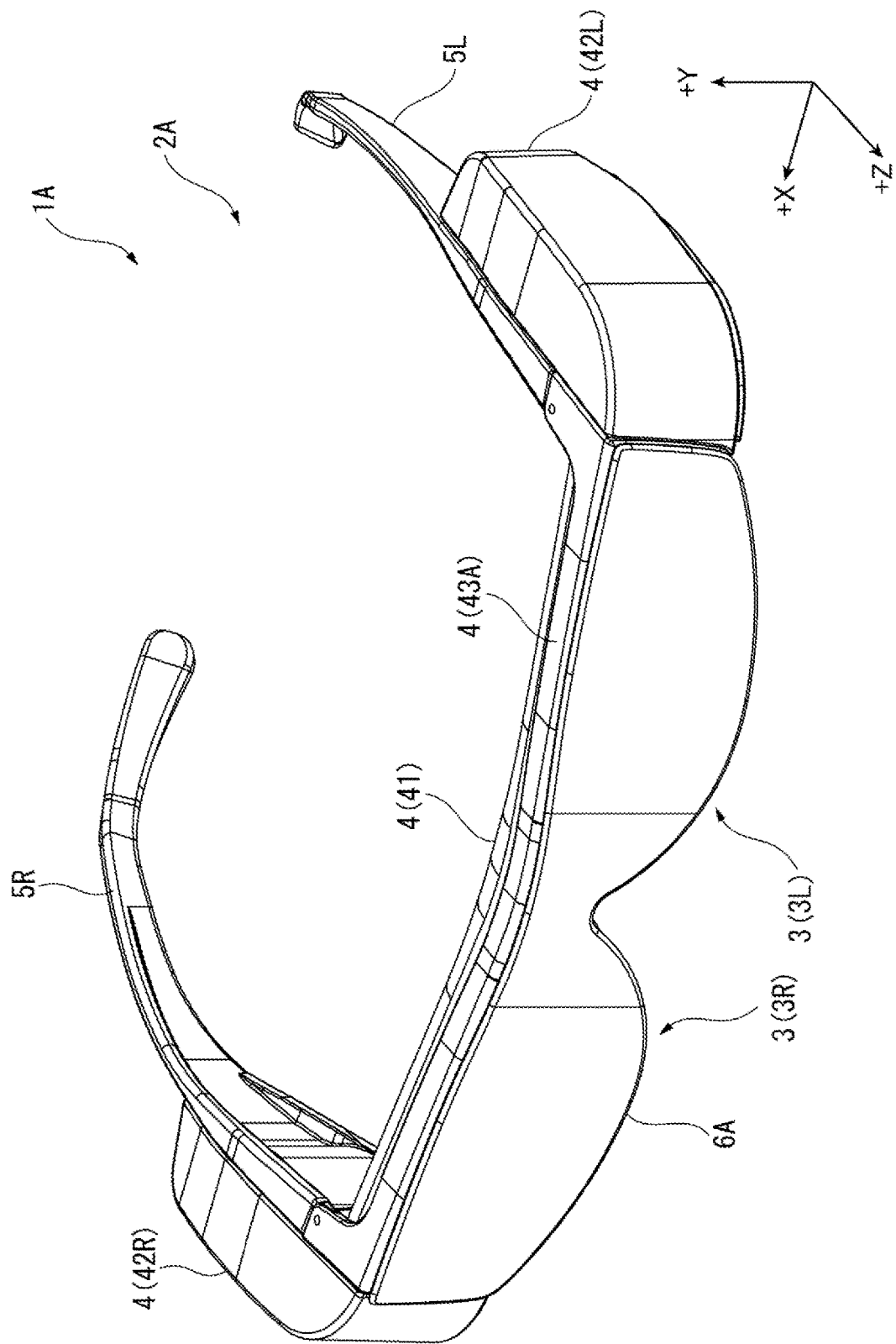
FIG. 1 is a perspective view illustrating a head-mounted display apparatus according to First Exemplary Embodiment of the present disclosure.
Figure 2:
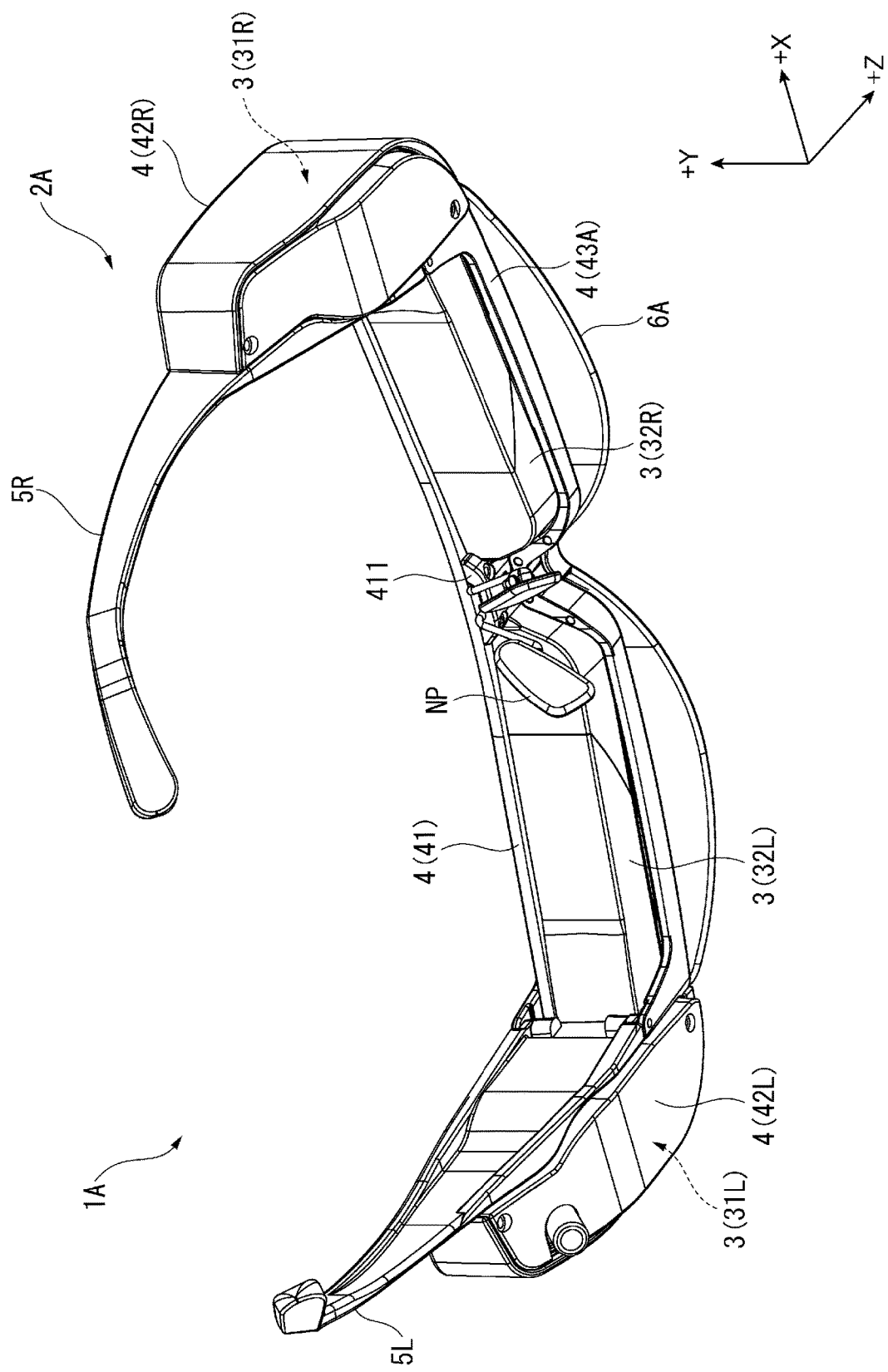
FIG. 2 is a perspective view illustrating the head-mounted display apparatus according to First Exemplary Embodiment.
Figure 3:
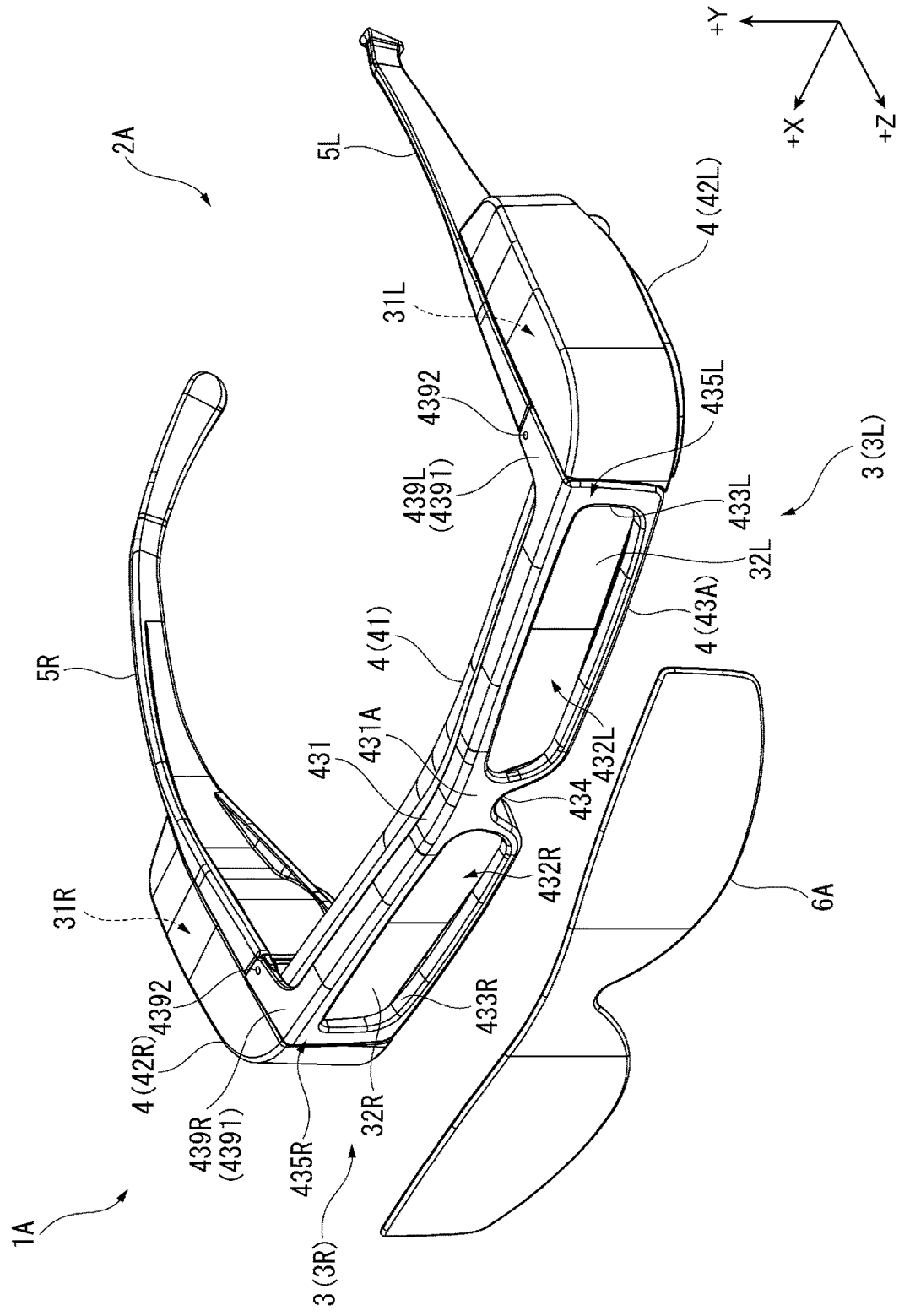
FIG. 3 is a perspective view illustrating the head-mounted display apparatus according to First Exemplary Embodiment from which a cover member is removed.
Figure 4:
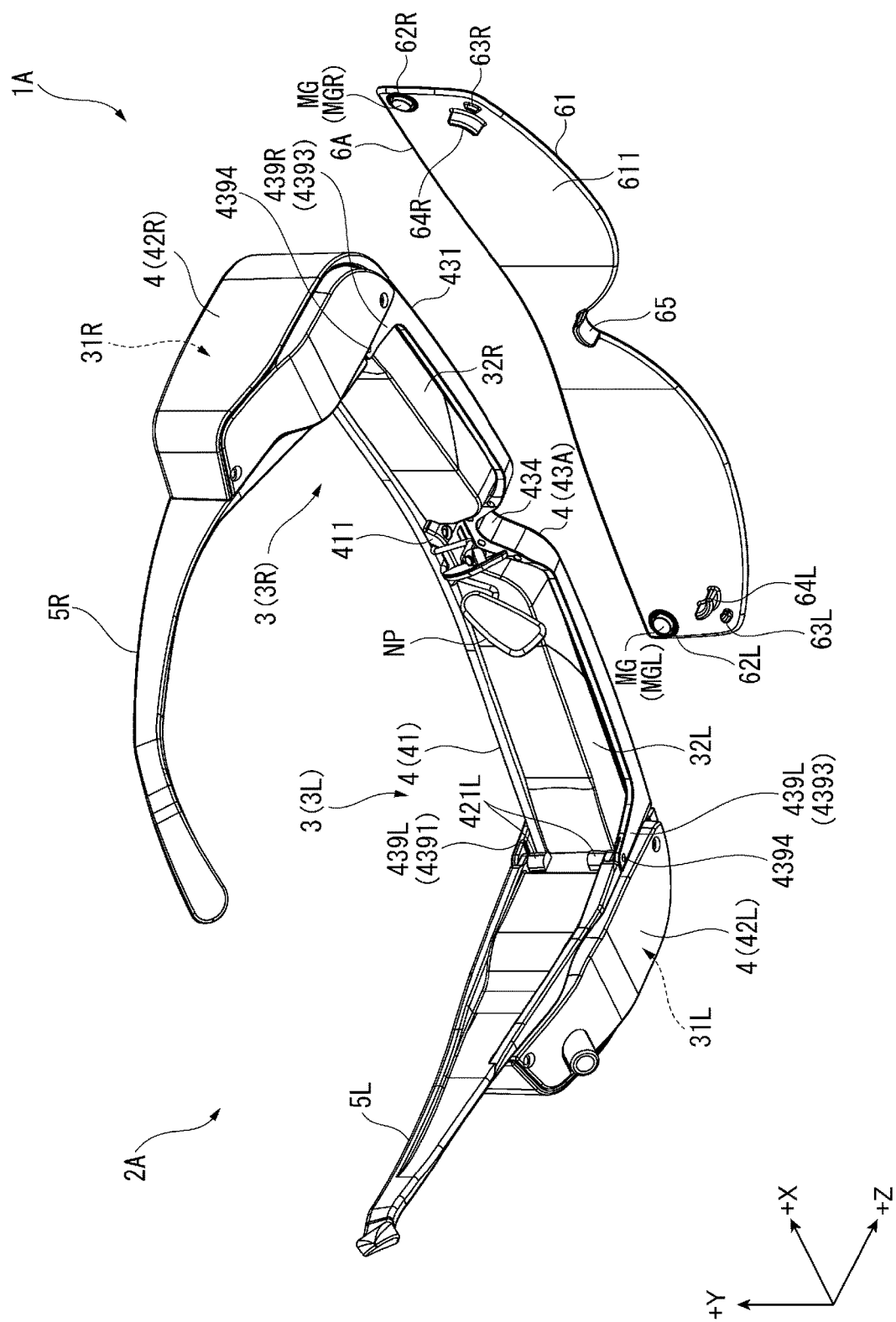
FIG. 4 is a perspective view illustrating the head-mounted display apparatus according to First Exemplary Embodiment from which the cover member is removed.

FIGS. 1 and 2 are perspective views illustrating a head-mounted display apparatus 1A according to the present exemplary embodiment as viewed from above on the front side and from below on the back side. FIGS. 3 and 4 are perspective views illustrating the head-mounted display apparatus 1A in a state in which a cover member 6A is removed from a device main body 2A as viewed from above on the front side and from below on the back side.

The head-mounted display apparatus 1A according to the present exemplary embodiment is a virtual image display device, which is used by being mounted on the head of the user and displays an image visually recognizable by the user, and is a so-called Head-Mounted Display (HMD). As illustrated in FIGS. 1 to 4, the head-mounted display apparatus 1A includes the device main body 2A and the cover member 6A removably mounted to the device main body 2A.

Note that, in the following description, a direction in which a visual line is oriented when a user observes an image displayed by the head-mounted display apparatus 1A is a front direction (front), and a direction opposite to the front direction is a back direction. That is, the front direction is a direction from the back to the front. An upper side and a lower side of the head-mounted display apparatus 1A correspond to an upper side and a lower side of the user, and a right side and a left side of the head-mounted display apparatus 1A correspond to a right side and a left side of the user. A +Z direction, a +Y direction, and a +X direction illustrated in the drawings after FIG. 1 are orthogonal to one another. The +Z direction indicates the front direction, the +Y direction indicates an upper direction (direction from the lower side to the upper side), and the +X direction indicates a right direction (direction from the left side to the right side). Although not illustrated, for the convenience of description, opposite directions of the +X direction, the +Y direction, and the +Z direction are a −X direction, a −Y direction, and a −Z direction, respectively. That is, the −Z direction corresponds to a first direction in which a display unit emits image light, and a direction opposite to the first direction is the +Z direction.

Configuration of Device Main Body

Figure 5:
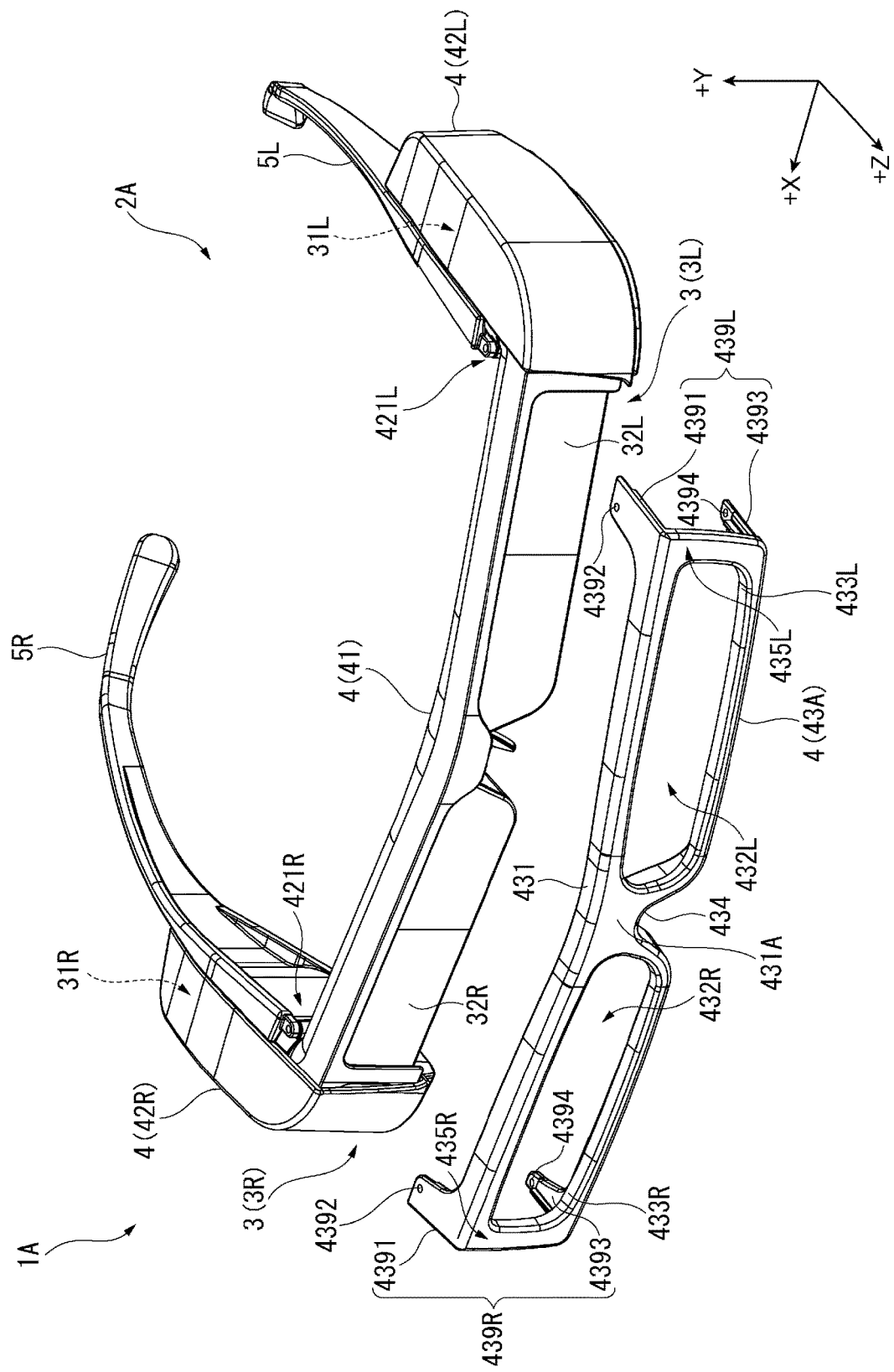
FIG. 5 is a perspective view illustrating a device main body from which a mounting member is separated in First Exemplary Embodiment.

FIG. 5 is a perspective view illustrating the device main body 2A in a state in which a mounting member 43A forming a support portion 4 is separated as viewed from above on the front side.

The device main body 2A alone can be used as a head-mounted display apparatus, and is mounted on the head of the user to display an image visually recognized by the user. That is, even when the cover member 6A is not used, the user can visually recognize an image by wearing the device main body 2A on the head.

As illustrated in FIGS. 3 to 5, the device main body 2A includes a display unit 3, the support portion 4, and temple portions 5L and 5R.

Of those, the temple portions 5L and 5R are members suspended from the left ear and the right ear at the time of mounting the device main body 2A on the head of the user. The temple portions 5L and 5R are suspended from the left ear and the right ear, and a nose pad NP described later abuts the nose of the user. In this manner, the device main body 2A is mounted on the head of the user.

Configuration of Display Unit

The display unit 3 is configured to emit and display an image at predetermined viewing positions. The predetermined viewing positions are the positions of exit pupils formed by optical systems forming the display unit 3. In the present exemplary embodiment, the predetermined viewing positions are set to imaginary positions corresponding to the left eye and the right eye of the user. The display unit 3 emits a left-eye image to the left eye of the user being one viewing position, and emits a right-eye image to the right eye of the user being the other viewing position. In this manner the left-eye image and the right-eye image are displayed visually recognizable by the user.

The display unit 3 includes a left-side display unit 3L, which is positioned on the left side of the user in the −X direction to emit left-eye image light to display the left-eye image formed by the left-eye image light, and a right-side display unit 3R, which is positioned on the right side of the user in the +X direction to emit right-eye image light to display the right-eye image formed by the right-eye image light.

Configuration of Left-Side Display Unit

The left-side display unit 3L includes a left-side emitting unit 31L being an image emitting unit that emits the left-eye image light forming the left-eye image and a left-side light-guiding portion 32L being a light-guiding portion that guides the emitted left-eye image light to the left eye of the user.

The left-side emitting unit 31L is stored in a left-side casing 42L described later, and is configured to generate and emit the left-eye image light corresponding to image information that is input from the outside. Although detail illustration is omitted, the left-side emitting unit 31L includes a control unit, an image forming unit, and an image projection unit.

The control unit is a circuit board configured to output, to an image forming unit, an image signal corresponding to the image information that is input from the outside and to cause the image forming unit to generate image light corresponding to the image information.

The image forming unit is configured to generate the left-eye image light corresponding to the input image signal under control of the control unit. The image forming unit may be formed by a self-luminous display panel such as an organic Electro-Luminescence (EL) panel. In addition, the image forming unit can be formed by a combination of a light source such as LED with a transmissive or reflective liquid crystal panel, or an optical modulation device such as a device employing a micro-mirror such as an MEMS mirror.

The image projection unit is formed with a lens or a prism, and is configured to project the image light generated by the image forming unit to the left-side light-guiding portion 32L.

The left-side light-guiding portion 32L is supported by a frame 41 described later, and is arranged at a position corresponding to the left eye of the user. The left-side light-guiding portion 32L internally reflects the left-eye image light, which is emitted by the left-side emitting unit 31L, on an interface, and guides the light to the left eye through a semitransparent layer provided correspondingly to the eye ball of the left eye of the user. That is, the left-side display unit 3L emits the left-eye image light in the −Z direction being the first direction from the left-side light-guiding portion 32L, to display the left-eye image visually recognizable by the user. The left-side light-guiding portion 32L is formed of resin such as cycloolefin polymer having high transmittance in a visible light region, and the user can observe surroundings through the left-side light-guiding portion 32L.

Configuration of Right-Side Display Unit

The right-side display unit 3R includes a right-side emitting unit 31R being an image emitting unit that emits the right-eye image light forming the right-eye image and a right-side light-guiding portion 32R being a light-guiding portion that guides the emitted right-eye image light to the right eye of the user.

The right-side emitting unit 31R is stored in a right-side casing 42R described later, and is configured to generate and emit the right-eye image light corresponding to image information that is input from the outside. Similar to the left-side emitting unit 31L, the right-side emitting unit 31R includes a control unit, an image forming unit, and an image projection unit.

Similar to the left-side light-guiding portion 32L, the right-side light-guiding portion 32R is supported by the frame 41 described later, and is arranged at a position corresponding to the right eye of the user. The right-side light-guiding portion 32R internally reflects the right-eye image light, which is emitted by the right-side emitting unit 31R, on an interface, and guides the light to the right eye through a semitransparent layer provided correspondingly to the eye ball of the right eye of the user. That is, the right-side display unit 3R emits the right-eye image light in the −Z direction being the first direction from the right-side light-guiding portion 32R, and displays the right-eye image visually recognizable by the user. The right-side light-guiding portion 32R is formed of a material similar to that of the left-side light-guiding portion 32L, which has transmittance, and the user can observe surroundings through the right-side light-guiding portion 32R.

As described above, the device main body 2A is a head-mounted display apparatus of a see-through type with which the user can observe an image and surroundings at the same time.

Configuration of Support Portion

As illustrated in FIGS. 3 to 5, the support portion 4 supports the display unit 3, and rotatably supports the temple portions 5L and 5R. The support portion 4 includes the frame 41 extending in the +X direction, the left-side casing 42L and the right-side casing 42R that are attached to the frame 41, and the mounting member 43A.

Configuration of Frame

The frame 41 is a metal member formed into a substantially U-like shape as viewed in the +Y direction, and has one end positioned in the −X direction and the other end positioned in the +X direction. The frame 41 is positioned in the +Y direction with respect to the left-side light-guiding portion 32L and the right-side light-guiding portion 32R, and supports the left-side light-guiding portion 32L and the right-side light-guiding portion 32R.

As illustrated in FIG. 4, the frame 41 includes an attaching portion 411 at a position between the left-side light-guiding portion 32L and the right-side light-guiding portion 32R. The attaching portion 411 is a portion to which the nose pad NP that abuts the nose of the user is removably attached. Note that, although illustration is omitted, the nose pad NP can be formed in accordance with a shape and a size of the nose of the user, and can be replaced for each user using the head-mounted display apparatus 1A.

Configuration of Left-Side Casing

The left-side casing 42L is a synthetic resin casing, which is attached to the left end of the frame 41 in the −X direction and stores the left-side emitting unit 31L. The left-side casing 42L includes an attaching portion 421L at a portion in the +X direction and the +Z direction. That is, the attaching portion 421L is provided to a side surface of the left-side casing 42L on the right-side casing 42R side.

The attaching portion 421L rotatably supports the temple portion 5L, and is a portion to which a fixing portion 439L of the mounting member 43A described later is fixed. The temple portion 5L supported by the attaching portion 421L is rotatable in a rotary range from a state in which an extending direction of the temple portion 5L from the attaching portion 421L is along the −Z direction to a state in which the extending direction of the temple portion 5L is along the +X direction.

Configuration of Right-Side Casing

The right-side casing 42R is a synthetic resin casing, which is attached to the right end of the frame 41 in the +X direction and stores the right-side emitting unit 31R. The right-side casing 42R includes an attaching portion 421R at a portion in the −X direction and the +Z direction. That is, the attaching portion 421R is provided to a side surface of the right-side casing 42R on the left-side casing 42L side.

Similar to the attaching portion 421L, the attaching portion 421R rotatably supports the temple portion 5R, and is a portion to which a fixing portion 439R of the mounting member 43A described later is fixed. Similar to the temple portion 5L described above, the temple portion 5R supported by the attaching portion 421R is rotatable in a rotary range from a state in which an extending direction of the temple portion 5R from the attaching portion 421R is along the −Z direction to a state in which the extending direction of the temple portion 5R is along the −X direction.

In a state in which the temple portions 5L and 5R are elongated so that the extending directions from the attaching portions 421L and 421R are along the −Z direction, the device main body 2A can be mounted on the head of the user. In a state in which the temple portions 5L and 5R are bent so that the extending directions from the attaching portions 421L and 421R are along the +X direction and the −X direction, the device main body 2A can be stored in a case or the like.

Configuration of Mounting Member

As illustrated in FIGS. 3 to 5, the mounting member 43A is attached to the attaching portions 421L and 421R, and forms a part of the support portion 4 in a state of covering the frame 41, the left-side light-guiding portion 32L, and the right-side light-guiding portion 32R in the +Z direction. The mounting member 43A is a portion of the support portion 4 to which the cover member 6A described later is removably mounted.

The mounting member 43A includes a main body portion 431, which is arranged in the +Z direction with respect to the left-side light-guiding portion 32L and the right-side light-guiding portion 32R, and the fixing portions 439L and 439R extending in the −Z direction from the main body portion 431.

The fixing portion 439L is provided at a position in the vicinity of the end of the main body portion 431 in the −X direction. The fixing portion 439L includes an upper arm portion 4391, which extends in the −Z direction from the end edge of the main body portion 431 in the +Y direction, and a lower arm portion 4393, which extends in the −Z direction from the end edge of the main body portion 431 in the −Y direction. The upper arm portion 4391 includes a through-hole 4392 passing through in the −Y direction, and the lower arm portion 4393 includes a through-hole 4394 passing through in the +Y direction.

The fixing portion 439R is provided at a position in the vicinity of the end of the main body portion 431 in the +X direction. Similar to the fixing portion 439L, the fixing portion 439R includes an upper arm portion 4391 including a through-hole 4392 and a lower arm portion 4393 including a through-hole 4394.

When the mounting member 43A is fixed to the left-side casing 42L and the right-side casing 42R, screws, which are threaded into screw holes (not illustrated) formed in the attaching portion 421L, are inserted into the through-holes 4392 and 4394 of the fixing portion 439L. More specifically, the screws are inserted into the through-holes 4392 and 4394, inserted into the temple portion 5L, and threaded into the screw holes of the attaching portion 421L.

Similarly, screws, which are threaded into screw holes (not illustrated) formed in the attaching portion 421R, are inserted into the through-holes 4392 and 4394 of the fixing portion 439R. More specifically, the screws are inserted into the through-holes 4392 and 4394, inserted into the temple portion 5R, and threaded into the screw holes of the attaching portion 421R. In this manner, the mounting member 43A is attached to the left-side casing 42L and the right-side casing 42R so that the main body portion 431 overlap with the left-side light-guiding portion 32L and the right-side light-guiding portion 32R as viewed in the +Z direction, that the fixing portion 439L sandwiches the frame 41 and the left-side light-guiding portion 32L in the +Y direction, and that the fixing portion 439R sandwiches the frame 41 and the right-side light-guiding portion 32R in the +Y direction.

As illustrated in FIGS. 3 and 5, the main body portion 431 includes a left-side frame portion 433L, which forms a left-side opening 432L having a substantially rectangular shape as viewed in the +Z direction, a right-side frame portion 433R, which similarly forms a right-side opening 432R having a substantially rectangular shape, a movement regulation portion 434, and magnetic-force acting portions 435L and 435R, which come into contact with the cover member 6A and act as a magnetic force for attracting the cover member 6A.

The left-side frame portion 433L and the right-side frame portion 433R correspond to a frame portion in the present disclosure.

The left-side opening 432L formed by the left-side frame portion 433L is provided at a position corresponding to the left-side light-guiding portion 32L. The right-side opening 432R formed by the right-side frame portion 433R is provided at a position corresponding to the right-side light-guiding portion 32R. More specifically, the left-side frame portion 433L is positioned in the +Z direction with respect to the left-side light-guiding portion 32L, and surrounds a display position of the left-eye image displayed by the left-side light-guiding portion 32L as viewed in the +Z direction. The right-side frame portion 433R is positioned in the +Z direction with respect to the right-side light-guiding portion 32R, and surrounds a display position of the right-eye image displayed by the right-side light-guiding portion 32R as viewed in the +Z direction. When the user observes surroundings through the left-side light-guiding portion 32L and the right-side light-guiding portion 32R, the visual line of the user passes through the left-side opening 432L and the right-side opening 432R.

In the left-side frame portion 433L, that is, in the left-side opening 432L, a first protruding portion 64L of the cover member 6A described later is arranged. In the right-side frame portion 433R, that is, in the right-side opening 432R, a first protruding portion 64R of the cover member 6A is arranged.

The movement regulation portion 434 is formed into a substantially upside-down U-like shape at the center in the +X direction of the end edge of the main body portion 431 in the −Y direction. That is, the movement regulation portion 434 is formed at a position at which the left-side frame portion 433L and the right-side frame portion 433R overlap with each other.

The movement regulation portion 434 is arranged to be configured to abut the attaching portion 411 of the frame 41, and restrict movement of the mounting member 43A, and abut a second protruding portion 65 of the cover member 6A described later to restrict movement of cover member 6A in the +Y direction.

In the present exemplary embodiment, the movement regulation portion 434 is formed into a substantially U-like shape recessed in the −Y direction as viewed in the +Z direction. However, the movement regulation portion 434 is not limited thereto, and the shape of the movement regulation portion 434 may be changed as appropriate in accordance with the shape of the second protruding portion 65 that abuts the movement regulation portion 434.

The magnetic-force acting portion 435L is provided in the vicinity of the end edge of the main body portion 431 in the −X direction. More specifically, the magnetic-force acting portion 435L is provided at a corner portion of a front surface 431A in the −X direction and the +Y direction. The front surface 431A is a surface of the main body portion 431 on the +Z direction side. The magnetic-force acting portion 435R is provided in the vicinity of the end edge of the main body portion 431 in the +X direction. More specifically, the magnetic-force acting portion 435R is provided at a corner portion of the front surface 431A in the +X direction and the +Y direction.

Figure 6:
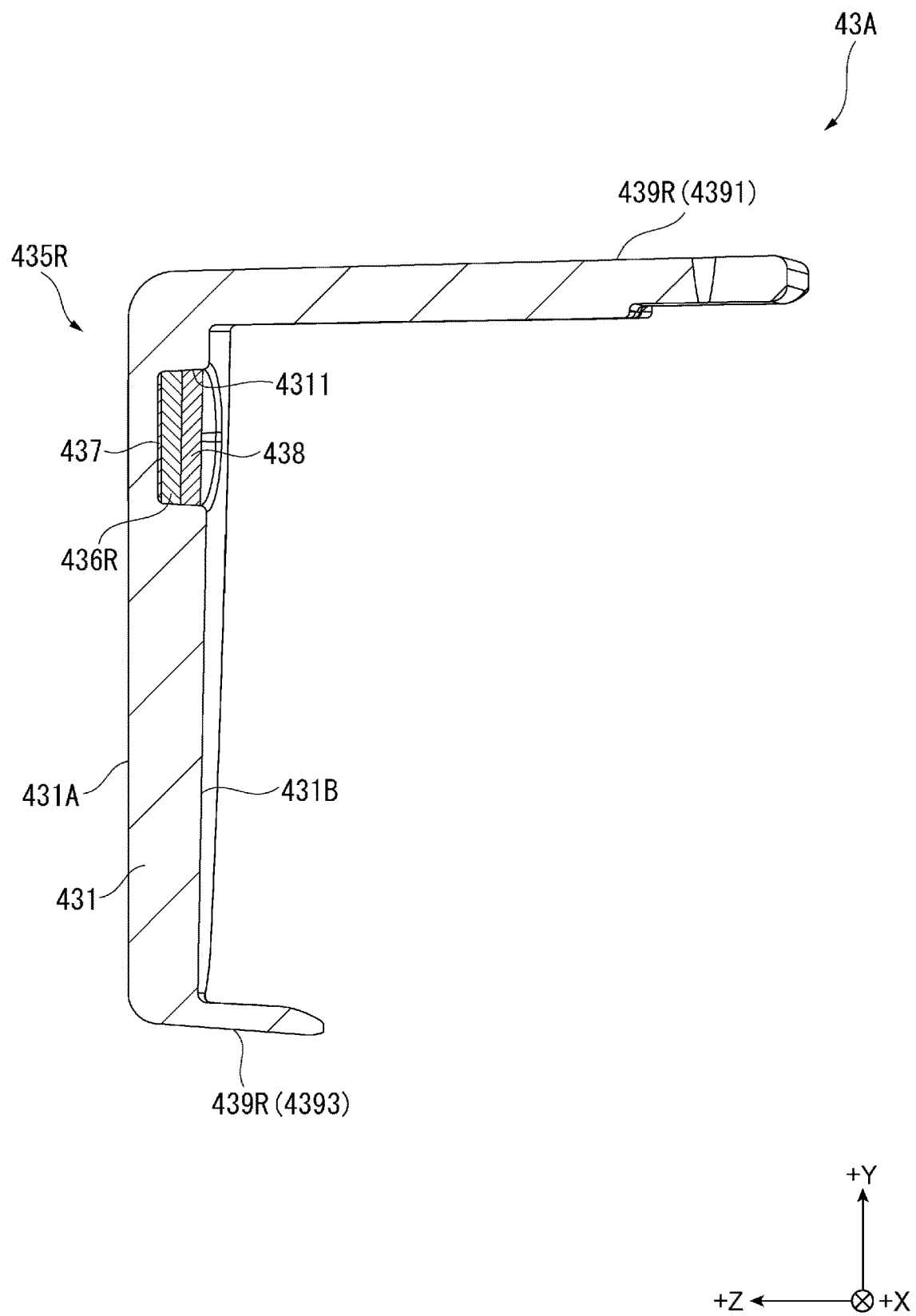
FIG. 6 is a sectional view illustrating the mounting member in First Exemplary Embodiment.

FIG. 6 is a diagram illustrating a cross section of the mounting member 43A taken along the YZ plane passing through the center of the magnetic-force acting portion 435R.

As illustrated in FIG. 6, the magnetic-force acting portion 435R of the magnetic-force acting portions 435L and 435R includes a magnet 436R, an adhesive sheet 437, and a yoke 438.

The magnet 436R attracts a magnet MG (MGR) provided to the cover member 6A, and attracts the cover member 6A. In the present exemplary embodiment, the magnet 436R is formed into a substantially columnar shape, and is arranged together with the yoke 438 in a recessed portion 4311, which is formed in a back surface 431B being a surface of the main body portion 431 in the −Z direction, by the adhesive sheet 437. However, the magnet 436R is not limited thereto. For example, the magnet 436R may be formed into other shapes, and may be attached by other means such as an adhesive agent.

The yoke 438 is provided in the −Z direction with respect to the magnet 436R to come into contact with the magnet 436R. The yoke 438 is provided in the −Z direction with respect to the magnet 436R, and hence a magnetic flux of the magnet 436R is induced in the +Z direction. According to this, an attracting force of the cover member 6A due to the magnet 436R can be intensified. Moreover, the magnetic flux can be prevented from being oriented in the −Z direction, and hence the magnetic force of the magnet 436R can be prevented from affecting circuit elements provided to the control unit of the right-side emitting unit 31R provided in the vicinity of the magnetic-force acting portion 435R.

Although illustration is omitted, similar to the magnetic-force acting portion 435R, the magnetic-force acting portion 435L includes the magnet 436L (see FIG. 8), the adhesive sheet 437, and the yoke 438. The magnet 436L, the adhesive sheet 437, and the yoke 438 are fitted into the recessed portion 4311 formed in the back surface 431B corresponding to the magnetic-force acting portion 435L. With the magnetic-force acting portion 435L described above, the cover member 6A is attracted to the main body portion 431 and the support portion 4. Moreover, the magnetic force of the magnet 436L can be prevented from affecting circuit elements provided to the control unit of the left-side emitting unit 31L.

Note that, magnetic poles of the surfaces of the magnets 436L and 436R in the +Z direction may be an S pole and an N pole. However, in the present exemplary embodiment, the magnetic pole of the surface of the magnet 436L in the +Z direction and the magnetic pole of the surface of the magnet 436R in the +Z direction are different from each other.

In this manner, the cover member 6A is mounted to the support portion 4 by the magnetic force of the magnets 436R and 436L corresponding to a support portion-side first magnet and a support portion-side second magnet.

Configuration of Cover Member

Figure 7:
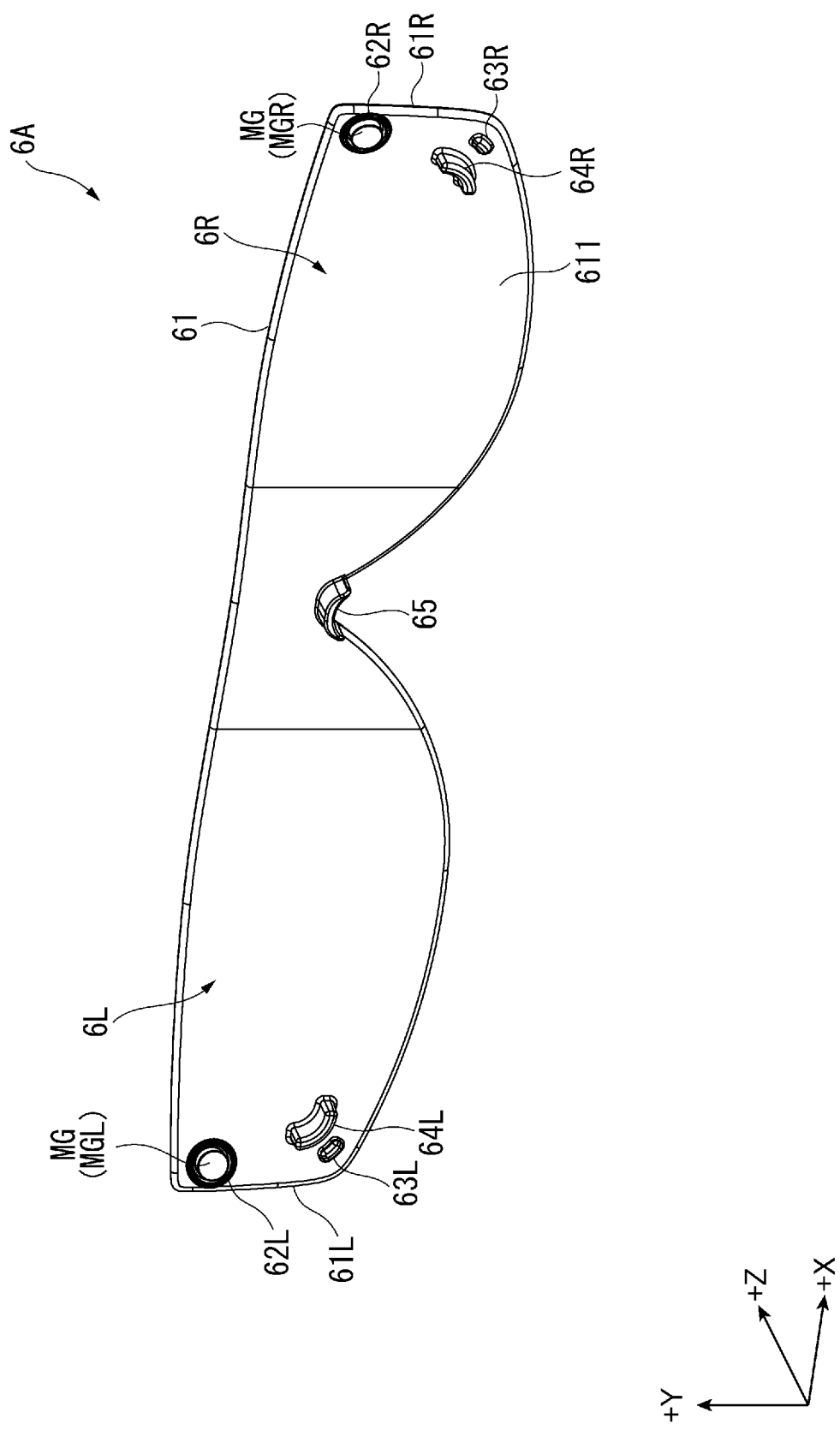
FIG. 7 is a perspective view illustrating the cover member according to First Exemplary Embodiment.

FIG. 7 is a perspective view illustrating the cover member 6A as viewed in the +Y direction and the −Z direction.

As illustrated in FIGS. 1 to 4, the cover member 6A is mounted to the mounting member 43A, and covers and protects the left-side light-guiding portion 32L and the right-side light-guiding portion 32R in the +Z direction. Moreover, the cover member 6A suppresses transmission of incident light in the +Z direction, and improves visibility of an image displayed by the display unit 3. That is, the cover member 6A has an incident light transmission suppression property.

As illustrated in FIG. 7, the cover member 6A includes a cover main body 61 and the magnets MG (MGL and MGR).

The cover main body 61 is formed of a synthetic resin, and is formed to have a size to entirely cover the left-side light-guiding portion 32L and the right-side light-guiding portion 32R as viewed in the +Z direction. The end edge of the cover main body 61 in the +Y direction is formed into a substantially linear shape along the +X direction. Meanwhile, the end edge of the cover main body 61 in the −Y direction is curved in an arc shape in the −Y direction as approaching the center in the +X direction from the end in the +X direction and the end in the −X direction, and then is curved in an arc shape in the +Y direction. At the center in +X direction of the end edge in the −Y direction, the second protruding portion 65 is provided.

The cover main body 61 includes contact portions 62L and 62R, restriction portions 63L and 63R, the first protruding portions 64L and 64R, and the second protruding portion 65 on a facing surface 611 being a surface facing the mounting member 43A in the −Z direction.

The contact portion 62L is provided at the corner portion of the facing surface 611 in the −X direction and the +Y direction, and the contact portion 62R is provided at the corner portion of the facing surface 611 in the +X direction and the +Y direction.

The contact portion 62L protrudes to have a substantially columnar shape. The contact portion 62L includes the magnet MGL therein. The position of the magnet MGL corresponds to the position of the magnet 436L when the cover member 6A is mounted to the mounting member 43A.

Similarly, the contact portion 62R protrudes to have a substantially columnar shape. The contact portion 62R includes the magnet MGR therein. The position of the magnet MGR corresponds to the magnet 436R when the cover member 6A is mounted to the mounting member 43A.

The magnets MGL and MGR corresponding to a cover-side first magnet and a cover-side second magnet are attracted to the corresponding magnets 436L and 436R. With this, the cover member 6A is mounted to the mounting member 43A and the support portion 4. More specifically, the magnets MGL and MGR are attracted to the magnets 436L and 436R, and the magnets MGL and MGR forming the ends of the contact portions 62L and 62R in the −Z direction come into contact with the front surface 431A of the mounting member 43A. In this manner, the cover member 6A is mounted to the support portion 4.

Note that, as described above, the magnet 436L and the magnet 436R have different magnetic poles on the surfaces facing the cover member 6A. Thus, the magnet MGL and the magnet MGR have different magnetic poles on the surfaces facing the mounting member 43A.

The restriction portion 63L is provided at the corner portion of the facing surface 611 in the −X direction and the −Y direction, and the restriction portion 63R is provided at the corner portion of the facing surface 611 in the +X direction and the −Y direction. More specifically, the restriction portion 63L is positioned in the −Y direction with respect to the contact portion 62L, and the restriction portion 63R is positioned in the −Y direction with respect to the contact portion 62R. In other words, the restriction portion 63L is positioned on an arrangement side of the first protruding portion 64L with respect to the contact portion 62L on the facing surface 611, and the restriction portion 63R is positioned on an arrangement side of the first protruding portion 64R with respect to the contact portion 62R on the facing surface 611.

The restriction portions 63L and 63R abut the front surface 431A when the contact portions 62L and 62R abut the front surface 431A of the mounting member 43A, and restrict the cover member 6A from being mounted in an inclined state in the −Y direction. Further, the restriction portions 63L and 63R restrict the first protruding portions 64L and 64R from coming into contact with the left-side light-guiding portion 32L and the right-side light-guiding portion 32R.

Figure 8:
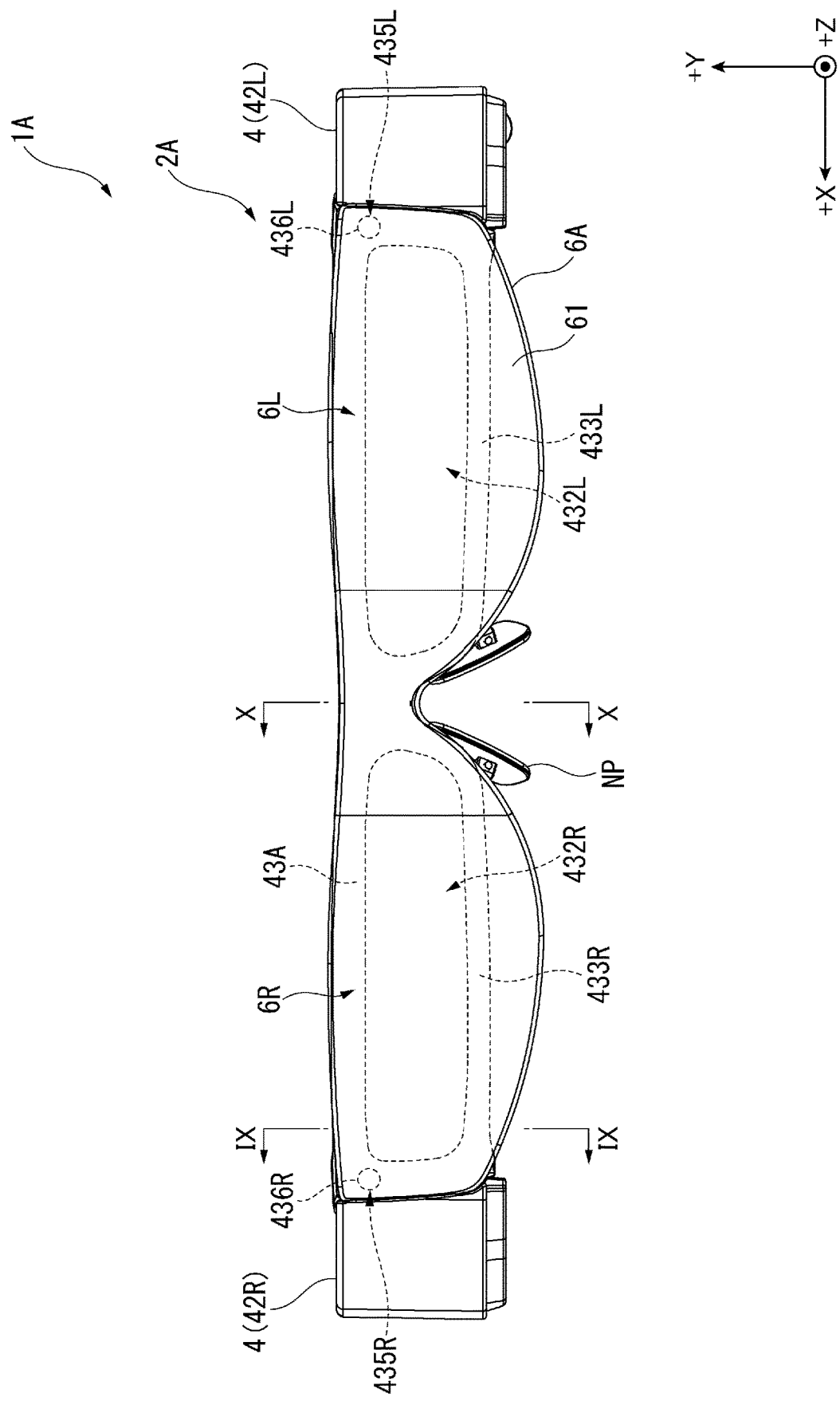
FIG. 8 is a front view illustrating the head-mounted display apparatus according to First Exemplary Embodiment.

FIG. 8 is a front view illustrating the head-mounted display apparatus 1A in which the cover member 6A is mounted to the device main body 2A, in other words, a plan view illustrating the head-mounted display apparatus 1A as viewed in the +Z direction.

The first protruding portions 64L and 64R and the second protruding portion 65 are provided to protrude in the −Z direction from the facing surface 611. More specifically, the first protruding portions 64L and 64R and the second protruding portion 65 protrude in the −Z direction from the positions on the inner side with respect to the outer edge of the cover member 6A as viewed in the +Z direction being the front direction of the head-mounted display apparatus 1A, that is, the +Z direction being a direction opposite to the first direction. That is, not only the contact portions 62L and 62R and the restriction portions 63L and 63R described above, but also the first protruding portions 64L and 64R and the second protruding portion 65 are provided on the inner side with respect to the outer edge of the cover member 6A as viewed in the +Z direction. Thus, as illustrated in FIG. 8, the contact portions 62L and 62R, the restriction portions 63L and 63R, the first protruding portions 64L and 64R, and the second protruding portion 65 are provided at the positions that are not visually recognized when the cover member 6A is viewed in the +Z direction.

As illustrated in FIG. 7, the first protruding portion 64L is formed into a substantially L-like shape as viewed in the −Z direction, and the first protruding portion 64R is formed into a substantially right-left reversed L-like shape as viewed in the −Z direction.

The first protruding portion 64L is provided at the position in the vicinity of the corner portion of the facing surface 611 in the −X direction and the −Y direction, the first protruding portion 64R is provided at the position in the vicinity of the corner portion of the facing surface 611 in the +X direction and the −Y direction. More specifically, the first protruding portion 64L is positioned in the +X direction and the +Y direction with respect to the restriction portion 63L, and the first protruding portion 64R is positioned in the −X direction and the +Y direction with respect to the restriction portion 63R.

In a state in which the cover member 6A is mounted to the mounting member 43A, the first protruding portion 64L is positioned to abut the inner end edge of the left-side frame portion 433L, and the first protruding portion 64L is positioned to abut the inner end edge of the right-side frame portion 433R.

Figure 9:
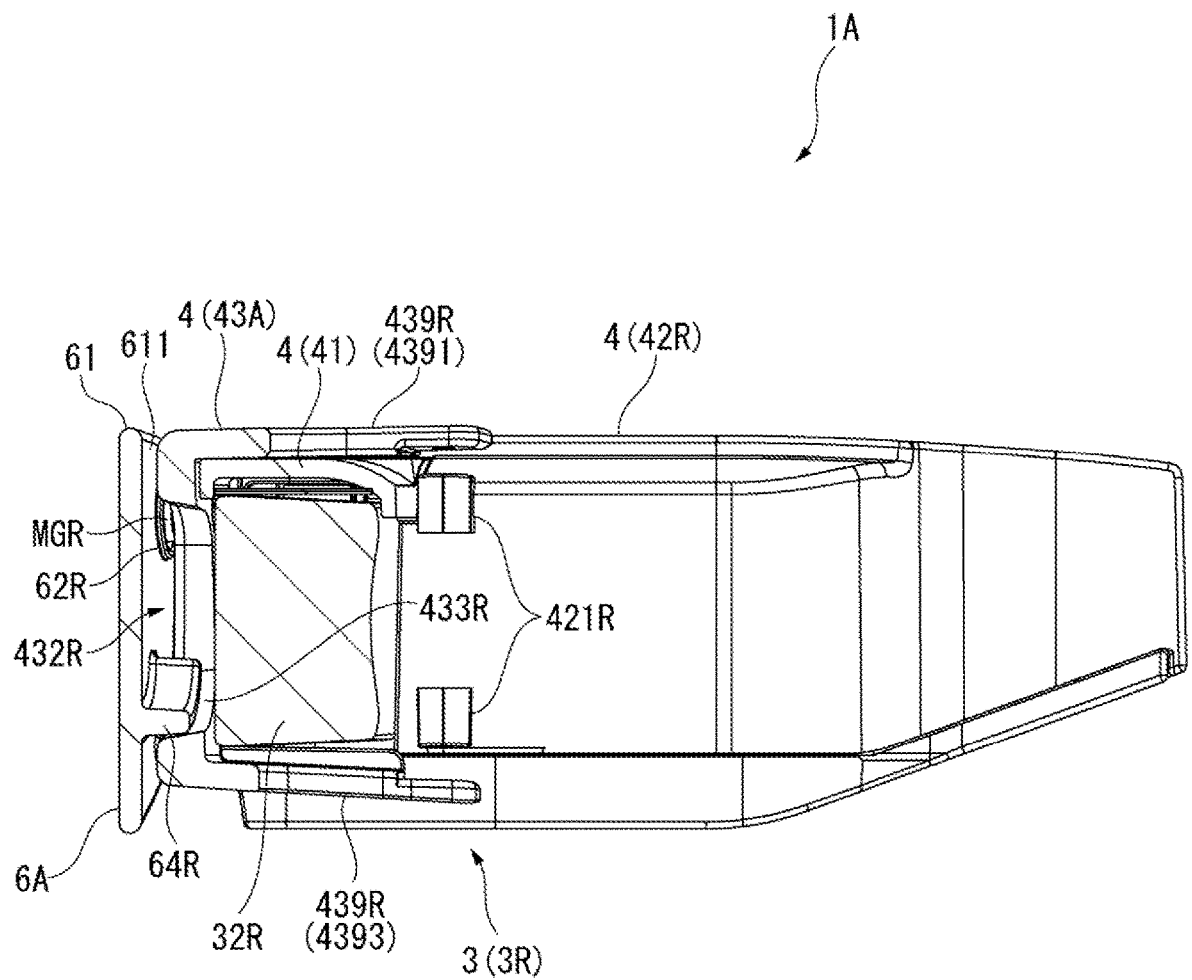
FIG. 9 is a diagram illustrating a cross section of the head-mounted display apparatus taken along the line IX-IX of FIG. 8.

FIG. 9 is a diagram illustrating a cross section of the head-mounted display apparatus 1A taken along the YZ plane, and is a sectional view illustrating the head-mounted display apparatus 1A taken along the cross section of line IX-IX of FIG. 8 as viewed in the −X direction. In other words, FIG. 9 is a view illustrating a fitting state of the first protruding portion 64R and the right-side frame portion 433R in the state in which the cover member 6A is mounted to the mounting member 43A. Note that, in FIG. 9, illustration of the temple portion 5R is omitted.

Specifically, as illustrated in FIG. 9, the first protruding portion 64R is arranged on the inner side of the right-side frame portion 433R and along the corner portion of the right-side frame portion 433R in the +X direction and the −Y direction. That is, the first protruding portion 64R is arranged to come into contact with the two portions intersecting each other on the inner end edge of the right-side frame portion 433R. More specifically, the first protruding portion 64R is arranged to come into contact with the two portions of the inner end edge of the right-side frame portion 433R, which are the inner end edge along the +Y direction in the +X direction and the inner end edge along the +X direction in the −Y direction.

Thus, when the cover member 6A mounted to the mounting member 43A is about to move in the +X direction or the −Y direction, the first protruding portion 64R abuts the inner end edge of the right-side frame portion 433R to restrict movement of the cover member 6A in the direction.

Note that, a protruding dimension of the first protruding portion 64R in the −Z direction is such a dimension that the distal end of the first protruding portion 64R in the −Z direction does not come into contact with the right-side light-guiding portion 32R.

Although illustration is omitted, the first protruding portion 64L is arranged so as to come into contact with the two positions intersecting each other on the inner end edge of the left-side frame portion 433L. More specifically, the first protruding portion 64L is arranged so as to come into contact with the two portions of the inner end edge of the left-side frame portion 433L, which are the inner end edge along the +Y direction in the −X direction and the inner end edge along the +X direction in the −Y direction. Thus, when the cover member 6A mounted to the mounting member 43A is about to move in the −X direction or the −Y direction, the first protruding portion 64L abuts the inner end edge of the left-side frame portion 433L to restrict movement of the cover member 6A in the direction.

Note that, similar to the first protruding portion 64R, a protruding dimension of the first protruding portion 64L in the −Z direction is a such dimension that the distal end of the first protruding portion 64L in the −Z direction does not come into contact with the left-side light-guiding portion 32L.

Figure 10:
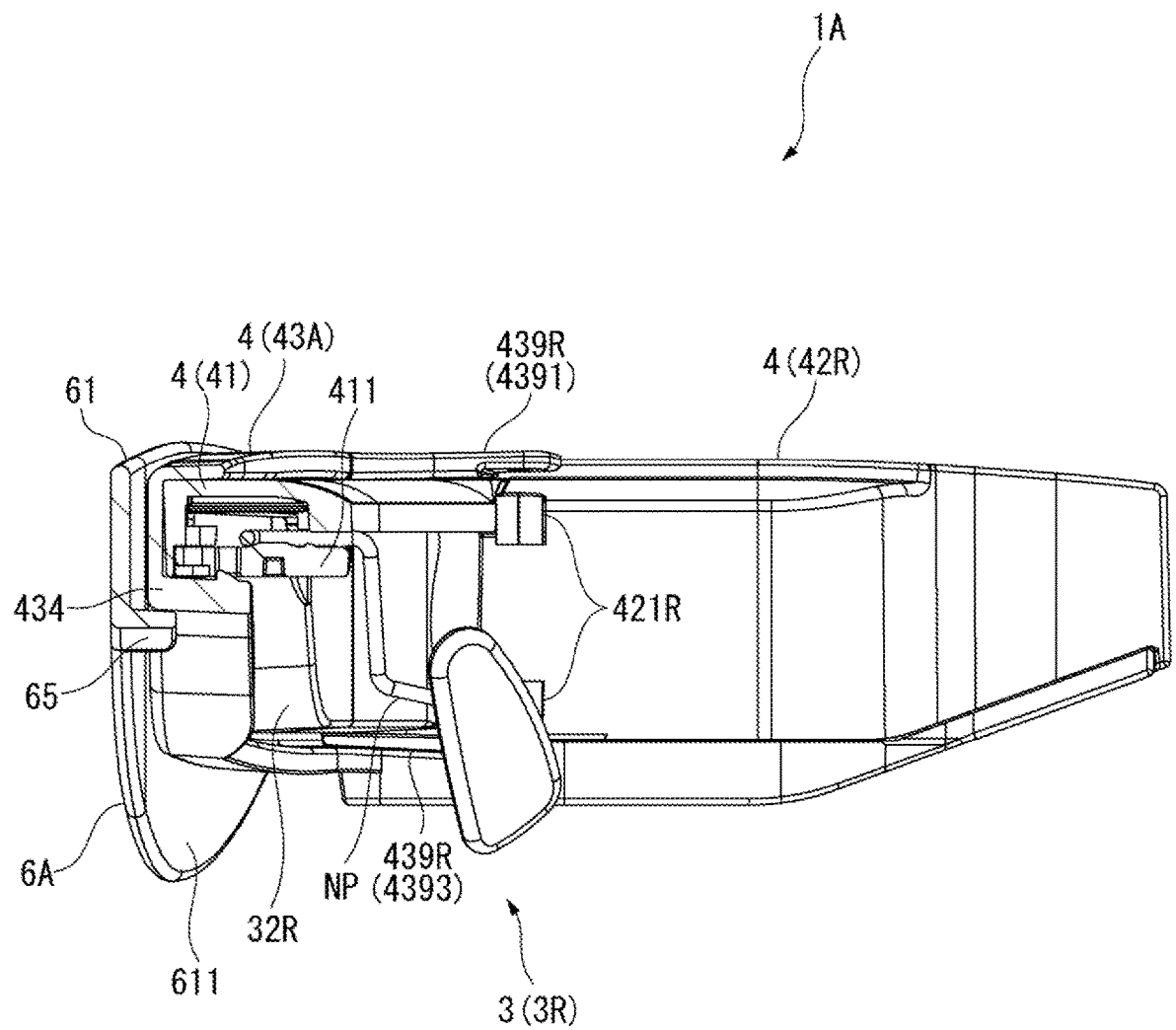
FIG. 10 is a diagram illustrating a cross section of the head-mounted display apparatus taken along the line X-X of FIG. 8.

FIG. 10 is a diagram illustrating a cross section of the head-mounted display apparatus 1A taken along the plane YZ, and is a sectional view illustrating the head-mounted display apparatus 1A taken along the cross section of line X-X of FIG. 8 as viewed in the −X direction. In other words, FIG. 10 is a view illustrating a fitting state of the second protruding portion 65 and the movement regulation portion 434 in the state in which the cover member 6A is mounted to the mounting member 43A.

As illustrated in FIG. 7, the second protruding portion 65 is formed into a substantially upside-down U-like shape, and is provide at the center in the +X direction of the end edge of the facing surface 611 on the −Y direction side. As illustrated in FIG. 10, when the cover member 6A is mounted to the mounting member 43A, the second protruding portion 65 is arranged at a position that can abut the movement regulation portion 434. When the cover member 6A is about to move in the +Y direction, the second protruding portion 65 abuts the movement regulation portion 434 to restrict movement of the cover member 6A in the +Y direction.

Figure 11:
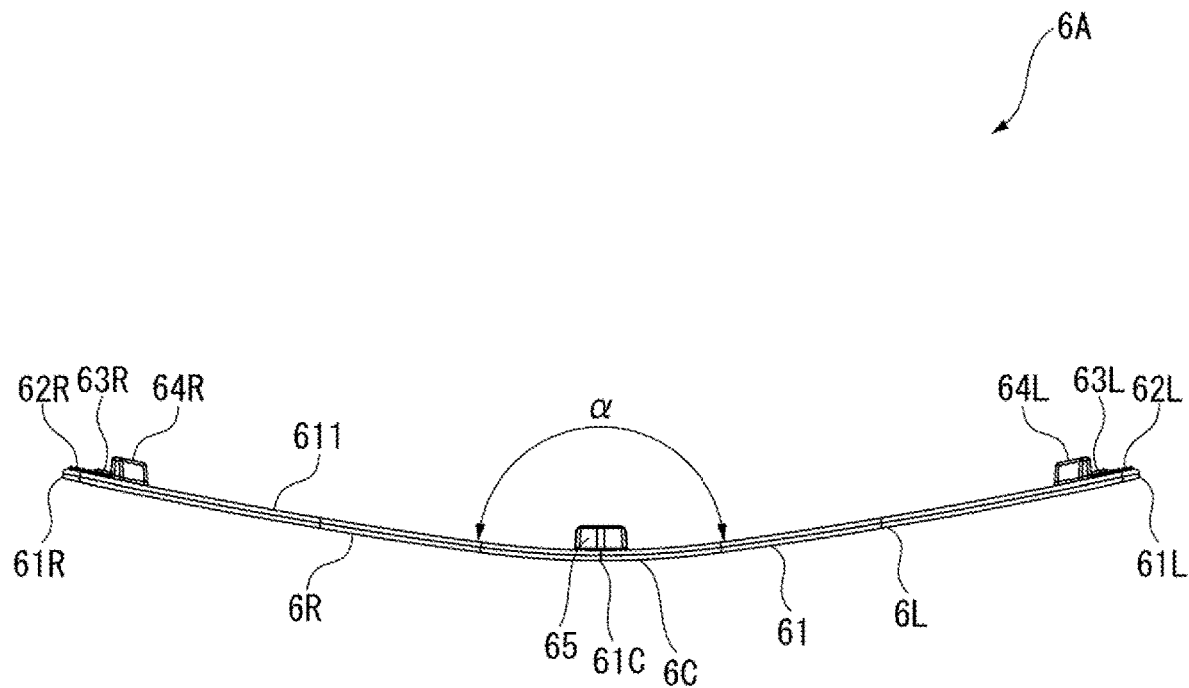
FIG. 11 is a plan view illustrating the cover member according to First Exemplary Embodiment.

FIG. 11 is a plan view illustrating the cover member 6A as viewed from the +Y direction side.

Note that, as illustrated in FIG. 11, the cover member 6A is inclined in the −Z direction as approaching in the +X direction and the −X direction from the center in the +X direction. In other words, in the cover main body 61, an end 61R on the +X direction being the right side and an end 61L on the −X direction being the left side are positioned in the −Z direction with respect to a center portion 61C in the +X direction.

In the present exemplary embodiment, a crossing angle α, which is formed by a left-side region 6L being a region from the center portion 61C to the end 61L and a right-side region 6R being a region from the center portion 61C to the end 61R in the cover member 6A, is set to be less than 170 degrees. According to this, the cover member 6A can be restricted from being mounted in a state in which the surface of the cover member 6A originally on the +Z direction side with respect to the mounting member 43A faces the mounting member 43A, that is, the cover member 6A can be restricted from being mounted reversely back to front.

Configuration of Other Cover Member

Figure 12:
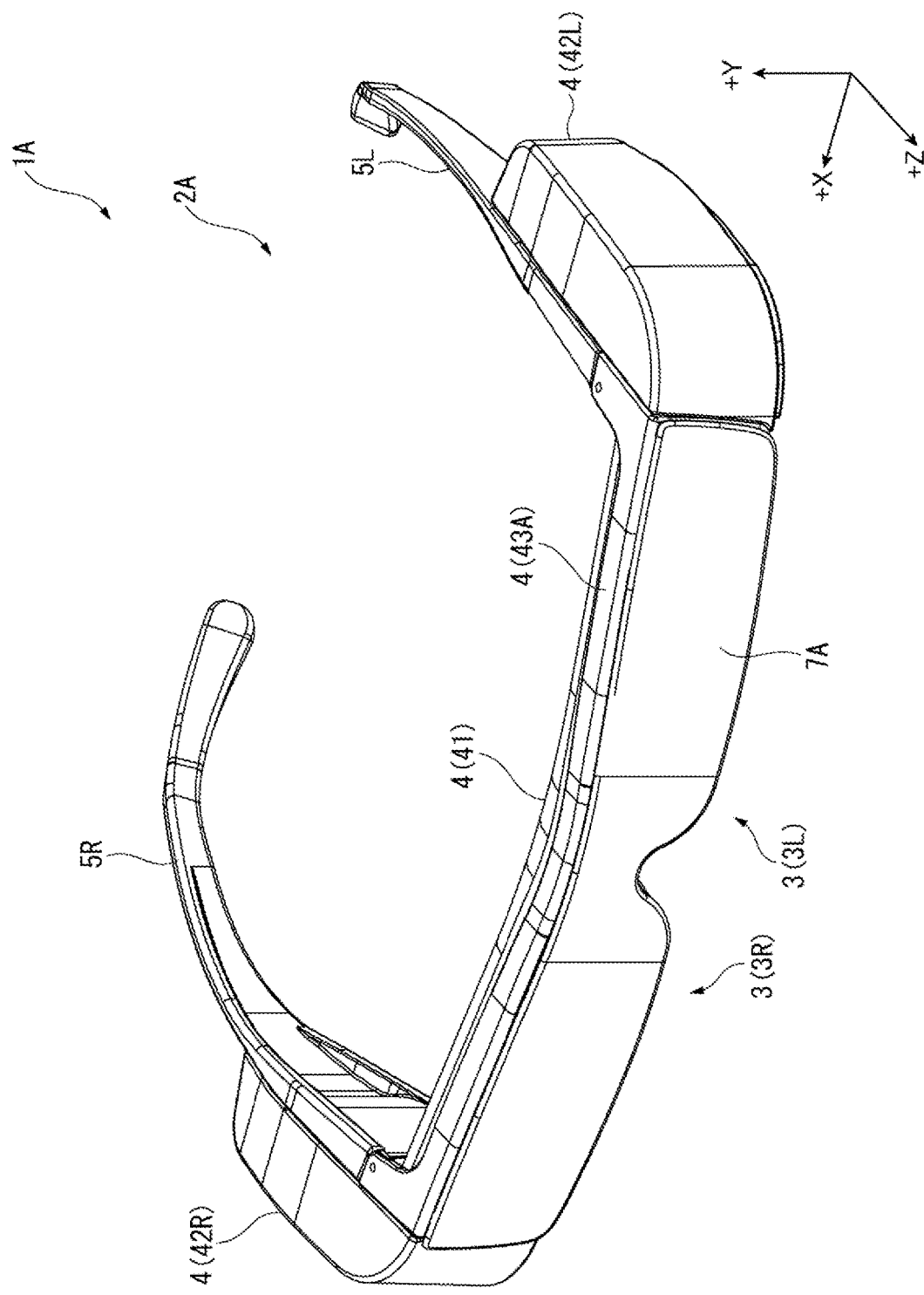
FIG. 12 is a perspective view illustrating the head-mounted display apparatus according to First Exemplary Embodiment, which includes another cover member.

FIG. 12 is a perspective view illustrating the head-mounted display apparatus 1A in which a cover member 7A is mounted to the support portion 4 as viewed from above on the front side.

As illustrated in FIG. 12, the head-mounted display apparatus 1A may be formed by adopting the cover member 7A in place of the cover member 6A. In other words, the device main body 2A may be formed of the removable cover member 7A.

Figure 13:
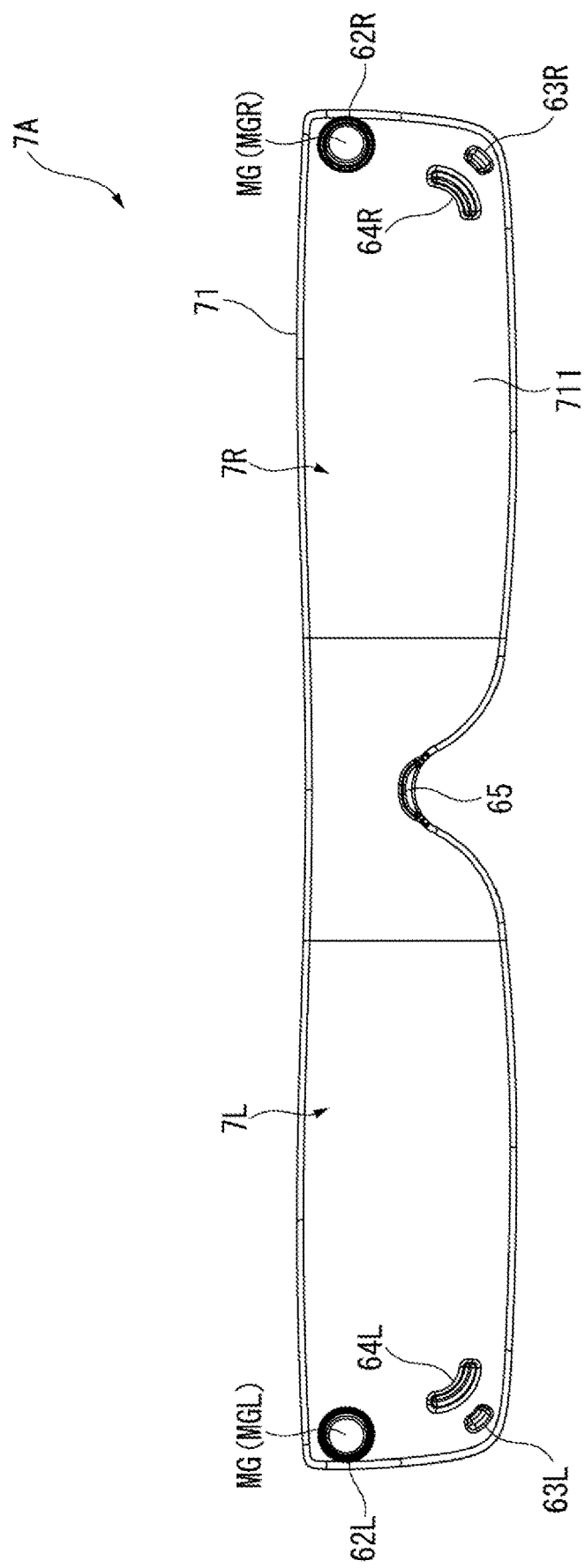
FIG. 13 is a back view illustrating the cover member according to First Exemplary Embodiment.

FIG. 13 is a back view illustrating the cover member 7A, that is, a plan view illustrating the cover member 7A as viewed in the −Z direction.

The cover member 7A is removably mounted to the mounting member 43A so as to cover the left-side light-guiding portion 32L and the right-side light-guiding portion 32R in the +Z direction, and has a similar configuration and function to the cover member 6A. That is, as illustrated in FIG. 13, the cover member 7A includes a cover main body 71 and the magnets MG (MGL and MGR).

Similar to the cover main body 61, the cover main body 71 includes the contact portions 62L and 62R, the regulating portions 63L and 63R, the first protruding portions 64L and 64R, and the second protruding portion 65 on a facing surface 711 facing the mounting member 43A. Further, the arrangement positions of the contact portions 62L and 62R, the regulating portions 63L and 63R, the first protruding portions 64L and 64R, and the second protruding portion 65 on the facing surface 711 are the same as the arrangement positions of the contact portions 62L and 62R, the regulating portions 63L and 63R, the first protruding portions 64L and 64R, and the second protruding portion 65 on the facing surface 611. The contact portion 62L includes the magnet MGL, and the contact portion 62R includes the magnet MGR.

Meanwhile, the outer shape of the cover main body 71 is smaller than the cover main body 61.

Here, as illustrated in FIG. 8, in the cover member 6A, the left-side region 6L and the right-side region 6R not only entirely cover the left-side light-guiding portion 32L and the right-side light-guiding portion 32R as viewed in the +Z direction, but are expanded further in the −Y direction. This is for the purpose of improving visibility of the image by blocking the light, which obliquely enters the left-side light-guiding portion 32L and the right-side light-guiding portion 32R from the −Y direction to the +Y direction, by the cover member 6A to enhance contrast of the displayed image.

Figure 14:
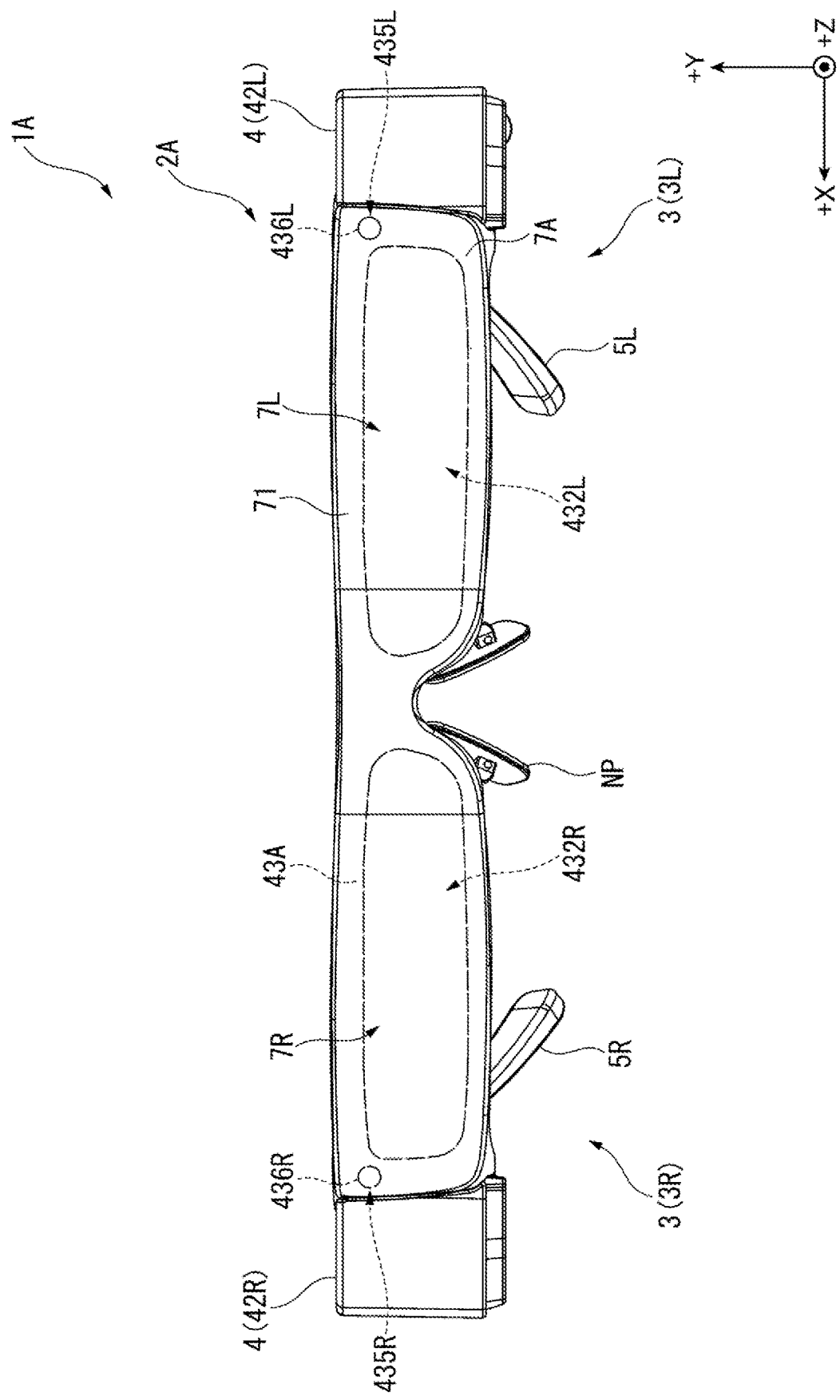
FIG. 14 is a front view illustrating the head-mounted display apparatus according to the First Exemplary Embodiment, which includes another cover member.

FIG. 14 is a front view illustrating the head-mounted display apparatus 1A in which the cover member 7A is mounted to the support portion 4, that is, a plan view illustrating the head-mounted display apparatus 1A including the cover member 7A as viewed in the +Z direction.

With respect to this point, as illustrated in FIG. 14, the cover main body 71 of the cover member 7A has a shape corresponding to the mounting member 43A as viewed in the +Z direction, and a left-side region 7L covering the left-side light-guiding portion 32L in the +Z direction and a right-side region 7R covering the right-side light-guiding portion 32R in the +Z direction do not spread very much in the −Y direction. This is for the purpose of weight reduction as well as a satisfactory appearance of the cover member 7A.

Note that, the cover member 7A also includes both the ends in the +X direction, which are positioned in the −Z direction with respect to the center in the +X direction, and the crossing angle α formed by the left-side region 7L and the right-side region 7R is set to be less than 170 degrees.

As described above, such cover member 7A has a similar configuration and function to the cover member 6A, and hence can exert similar effects as the cover member 6A.

Effects of First Exemplary Embodiment

With the head-mounted display apparatus 1A according to the present exemplary embodiment described above, the following effects can be exerted.

The head-mounted display apparatus 1A mounted on the head of the user includes the display unit 3 configured to emit and display the image light in the −Z direction being the first direction to the left eye and the right eye of the user being the predetermined viewing positions, the support portion 4 configured to support the display unit 3, and the cover member 6A positioned in the +Z direction being a direction opposite to the −Z direction with respect to the display unit 3 and removably provided to the support portion 4. The cover member 6A includes the contact portions 62L and 62R, which are positioned on the facing surface 611 facing the mounting member 43A of the support portion 4 and come into contact with the mounting member 43A, and the first protruding portions 64L and 64R, which are positioned on the facing surface 611, protrude toward the mounting member 43A, and are inserted into the left-side frame portion 433L and the right-side frame portion 433R of the mounting member 43A. The mounting member 43A of the support portion 4 includes the magnets 436L and 436R that attract the cover member 6A by a magnetic force, and the cover member 6A includes the magnets MGL and MGR that attract the mounting member 43A by a magnetic force. Further, the contact portions 62L and 62R and the first protruding portions 64L and 64R are provided on the inner side with respect to the outer edge of the cover member 6A when the cover member 6A is viewed in the +Z direction.

According to this, by the magnetic force of the magnets 436L and 436R of the magnetic-force acting portions 435L and 435R and the magnetic force of the magnets MG (MGL and MGR) of the contact portions 62L and 62R, the cover member 6A can be mounted to the mounting member 43A of the support portion 4. In this state, even when the cover member 6A is about to slide along the mounting member 43A, the first protruding portions 64L and 64R inserted into the left-side frame portion 433L and the right-side frame portion 433R abut the inner end edges of the left-side frame portion 433L and the right-side frame portion 433R, thereby being capable of regulating slide of the cover member 6A. Therefore, the cover member 6A can be prevented from sliding to a range on which the magnetic force of the magnets 436L, 436R, MGL, and MGR is not limited, and coming off the mounting member 43A.

Further, the contact portions 62L and 62R and the first protruding portions 64L and 64R are provided on the inner side with respect to the outer edge of the cover member 6A as viewed in the +Z direction. According to this, when the cover member 6A is mounted to the mounting member 43A, the structure for mounting the cover member 6A on the mounting member 43A can be less visible from the outside. The magnets 436L and 436R are provided on the back surface 431B being a surface of the mounting member 43A in the −Z direction, and hence the structure for mounting the cover member 6A on the mounting member 43A can be less visible from the outside when the cover member 6A is removed from the support portion 4. Thus, the appearance of the head-mounted display apparatus 1A can be satisfactory.

Note that, when the magnets MGL and MGR form the contact portions 62L and 62R, the magnet MGL can easily be arranged in a magnetic field of the magnet 436L. In addition, the magnet MGR can easily be arranged in a magnetic field of the magnet 436R. Thus, the cover member 6A can be mounted to the mounting member 43A and the support portion 4 more firmly.

Those effects can also be exerted when the cover member 7A is used.

The display unit 3 includes the left-side display unit 3L and the right-side display unit 3R. The left-side display unit 3L includes the left-side light-emitting unit 31L being an image emitting unit that emits the left-eye image light and the left-side light-guiding portion 32L that guides the left-eye image light, which is emitted by the left-side emitting unit 31L, to the left eye of the user. Similarly, the right-side display unit 3R includes the right-side emitting unit 31R being an image emitting unit that emits the right-eye image light and the right-side light-guiding portion 32R that guides the right-eye image light, which is emitted by the right-side emitting unit 31R, to the right eye of the user. The mounting member 43A of the support portion 4 includes the left-side frame portion 433L, which is positioned on the cover member 6A side with respect to the left-side light-guiding portion 32L and surrounds a display position of the left-eye image formed by the left-eye image light guided by the left-side light-guiding portion 32L, and the right-side frame portion 433R, which is positioned on the cover member 6A side with respect to the right-side light-guiding portion 32R and surrounds a display position of the right-eye image formed by the right-eye image light guided by the right-side light-guiding portion 32R. Further, the first protruding portion 64L is arranged to be capable of abutting the inner end edge of the left-side frame portion 433L, and the first protruding portion 64R is arranged to be capable of abutting the inner end edge of the right-side frame portion 433R.

According to this, the recessed portions into which the first protruding portions 64L and 64R are inserted are not required to be provided additionally to the mounting member 43A. Thus, the appearance of the head-mounted display apparatus 1A used in a state in which the cover member 6A is not mounted thereto, that is, the device main body 2A that can be used alone as a head-mounted display apparatus can be satisfactory. The same applies to the case where the cover member 7A is used in place of the cover member 6A.

The first protruding portion 64L are arranged to be capable of coming into contact with two portions intersecting each other on the inner end edge of the left-side frame portion 433L, and the first protruding portion 64R is arranged to be capable of coming into contact with two portions intersecting each other on the inner end edge of the right-side frame portion 433R. That is, the first protruding portion 64L is arranged at the position corresponding to the corner portion in the −X direction and the −Y direction on the inner end edge of the left-side frame portion 433L to be capable of coming into the two portions on the inner end edge in the −X direction and the inner end edge in the +Y direction. The first protruding portion 64R is arranged at the position corresponding to the corner portion in the +X direction and the −Y direction on the inner end edge of the right-side frame portion 433R to be capable of coming into contact with the two portions on the inner end edge in the +X direction and the inner end edge in the +Y direction.

According to this, the cover member 6A can be regulated from sliding along the mounting member 43A in the ±X directions and the −Y direction. The two first protruding portions 64L and 64R can regulate slide of the cover member 6A in the three directions, and hence the configuration of the cover member 6A can be simplified as compared to the case where the protruding portion for regulating movement of the cover member is provided for each of the ±X directions and the ±Y directions. Moreover, the first protruding portions 64L and 64R are provided to be capable of abutting the portions positioned on the outer side of the mounting member 43A on the inner end edges of the left-side frame portion 433L and the right-side frame portion 433R. Thus, the first protruding portions 64L and 64R can be arranged at the positions that are less visually recognizable by the user. The same applies when the cover member 7A is used in place of the cover member 6A.

Here, the left-side light-guiding portion 32L and the right-side light-guiding portion 32R internally reflect the left-eye image and the right-eye image in the interfaces to guide the images to the left eye and the right eye of the user. Thus, when members that come into contact with the interfaces on which the image is reflected are present in the left-side light-guiding portion 32L and the right-side light-guiding portion 32R, the image may not be guided appropriately.

With respect to this point, the protruding dimension of the first protruding portions 64L and 64R in the −Z direction is a dimension that does not come into contact with the left-side light-guiding portion 32L and the right-side light-guiding portion 32R. According to this, the first protruding portions 64L and 64R can be prevented from coming into contact with the left-side light-guiding portion 32L and the right-side light-guiding portion 32R. Thus, the left-side light-guiding portion 32L and the right-side light-guiding portion 32R can appropriately guide the left-eye image and the right-eye image to the left eye and the right eye of the user.

The cover members 6A and 7A include the regulating portion 63L, which is positioned on the facing surfaces 611 and 711 on the arrangement side of the first protruding portion 64L with respect to the contact portion 62L and regulates contact of the first protruding portion 64L with the left-side light-guiding portion 32L by coming into contact with the mounting member 43A of the support portion 4. The cover members 6A and 7A include the regulating portion 63R, which is positioned on the facing surfaces 611 and 711 on the arrangement side of the first protruding portion 64R with respect to the contact portion 62R and regulates contact of the first protruding portion 64R with the right-side light-guiding portion 32R by coming into contact with the mounting member 43A.

According to this, as described above, the left-side light-guiding portion 32L and the right-side light-guiding portion 32R can be prevented from coming into contact with the first protruding portions 64L and 64R, and hence the left-eye image and the right-eye image can be appropriately guided to the left eye and the right eye of the user. The regulating portions 63L and 63R that come into contact with the front surface 431A are arranged as described above, and hence the cover members 6A and 7A can be prevented from being mounted to the mounting member 43A while being inclined to be oriented in the −Y direction.

The display unit 3 includes the right-side light-guiding portion 32R provided correspondingly to the right eye of the user and the left-side light-guiding portion 32L provided correspondingly to the left eye of the user. The mounting member 43A includes, as frame portions, the right-side frame portion 433R provided correspondingly to the right-side light-guiding portion 32R and the left-side frame portion 433L provided correspondingly to the left-side light-guiding portion 32L. The cover members 6A and 7A include the second protruding portion 65, which is provided inner side on the outer edge of the cover members 6A and 7A when the cover members 6A and 7A are viewed in the +Z direction being a direction opposite to the first direction and is capable of abutting the movement regulation portion 434 between the right-side frame portion 433R and the left-side frame portion 433L of the mounting member 43A in the +Y direction. Meanwhile, the first protruding portion 64R is provided correspondingly to the corner portion in the +X direction and the −Y direction on a side opposite to the left-side frame portion 433L among the corner portions of the right-side frame portion 433R. The first protruding portion 64L is provided correspondingly to the corner portion in the −X direction and the −Y direction on a side opposite to the right-side frame portion 433R among the corner portions of the left-side frame portion 433L.

According to this, as described above, the first protruding portions 64L and 64R can prevent the cover members 6A and 7A from sliding along the mounting member 43A in the ±X directions and the −Y direction. The second protruding portion 65 can prevent the cover members 6A and 7A from sliding along the mounting member 43A in the +Y direction. Thus, the cover members 6A and 7A can be prevented from being shifted and coming off the mounting member 43A.

The left-side light-guiding portion 32L and the right-side light-guiding portion 32R have a transmission property that allows transmission of incident light in the +Z direction being a side of the cover members 6A and 7A. Meanwhile, the cover members 6A and 7A have a transmission suppression property that suppresses transmission of incident light.

According to this, the left-side light-guiding portion 32L and the right-side light-guiding portion 32R, which are arranged correspondingly to the left eye and the right eye of the user and guide the left-eye image light and the right-eye image light, have a transmission property, and hence the head-mounted display apparatus 1A of a see-through type, which enables observation of a displayed image and surroundings, can be configured.

The cover members 6A and 7A, which are mounted to the left-side light-guiding portion 32L and the right-side light-guiding portion 32R in the +Z direction, have a transmission suppression property. Thus, light that enters the eyes of the user from the outside of the head-mounted display apparatus 1A can be reduced, and the displayed image can be observed easily.

The mounting member 43A includes the magnets 436L and 436R being a support portion-side first magnet and a support portion-side second magnet, which are provided away from each other. The cover members 6A and 7A include the magnets MGL and MGR being a cover-side first magnet and a cover-side second magnet that attract the magnets 436L and 436R. Further, the magnetic pole of the surface of the magnet 436L, which faces the cover members 6A and 7A, and the magnetic pole of the surface of the magnet 436R, which faces the cover members 6A and 7A, are different from each other. In other words, the magnetic pole of the surface of the magnet MGL, which faces the mounting member 43A, and the magnetic pole of the surface of the magnet MGR, which faces the mounting member 43A, are different from each other.

According to this, the cover members 6A and 7A can be prevented from being mounted to the mounting member 43A in a right-left opposite manner.

The mounting member 43A includes the magnets 436L and 436R and the yoke 438 for intensifying an attracting force due to magnetic force of the magnets 436L and 436R.

According to this, the yoke 438 can intensify an attracting force of the magnets 436L and 436R, and hence the cover members 6A and 7A can firmly be mounted to the mounting member 43A. In addition, the yoke 438 can control an orientation of the magnetic flux of the magnets 436L and 436R, and hence the magnetic force of the magnets 436L and 436R can be prevented from affecting the circuit elements of the control unit positioned in the −Z direction with respect to the magnets 436L and 436R.

The cover members 6A and 7A include the right-side region 6R, which is arranged correspondingly the right eye of the user and covers the right-side light-guiding portion 32R in the +Z direction, and the left-side region 6L, which is arranged correspondingly to the left eye of the user and covers the left-side light-guiding portion 32L in the +Z direction. Further, the right-side region 6R and the left-side region 6L incline to the mounting member 43A side, that is, in the −Z direction, as distanced away from each other. Further, the crossing angle α formed by the right-side region 6R and the left-side region 6L is less than 170 degrees.

According to this, the cover member 6A can be prevented from being mounted to the mounting member 43A in a front-back opposite manner. In addition, the cover member 6A can be prevented from sliding in the ±X directions with respect to the mounting member 43A.

The cover member 6A is removably provided to the mounting member 43A forming the support portion 4 of the head-mounted display apparatus 1A including the support portion 4 to which the display unit 3 that emits the image light to display the image is provided. The cover member 6A includes the contact portions 62L and 62R, which come into contact with the mounting member 43A, the first protruding portions 64L and 64R being protruding portions, which protrude toward the mounting member 43A and are inserted into the mounting member 43A, and the magnets MGL and MGR, which attract the mounting member 43A by a magnetic force. Further, in the cover member 6A, the contact portions 62L and 62R and the first protruding portions 64L and 64R are provided on the inner side with respect to the outer edge of the cover member 6A when the cover member 6A is viewed in the +Z direction being a direction opposite to a side from which the display unit 3 emits the image light. The cover member 7A is similarly configured.

Such cover members 6A and 7A are mounted to the mounting member 43A of the device main body 2A that can be used alone. According to this, the head-mounted display apparatus 1A can exert the above-mentioned effects. When the structure for mounting the cover members 6A and 7A to the mounting member 43A can be less visible from the outside when the cover members 6A and 7A are mounted to the mounting member 43A, and hence the appearance of the head-mounted display apparatus 1A can be satisfactory.

Modifications of First Exemplary Embodiment

The cover members 6A and 7A described above include the two first protruding portions 64L and 64R protruding in the −Z direction from the cover main body 61. However, the first protruding portions are not limited thereto, and the positions and the number of the first protruding portions, which are arranged on the inner side of the left-side frame portion 433L and the right-side frame portion 433R and regulate the slide of the cover member by coming into contact with those inner end edges may be changed as appropriate.

For example, the first protruding portion 64L may be provided at any of the two corner portions of the left-side frame portion 433L, which are positioned in the +X direction, and the first protruding portion 64R may be provided at any of the two corner portions of the right-side frame portion 433R, which are positioned in the −X direction.

Figure 15:
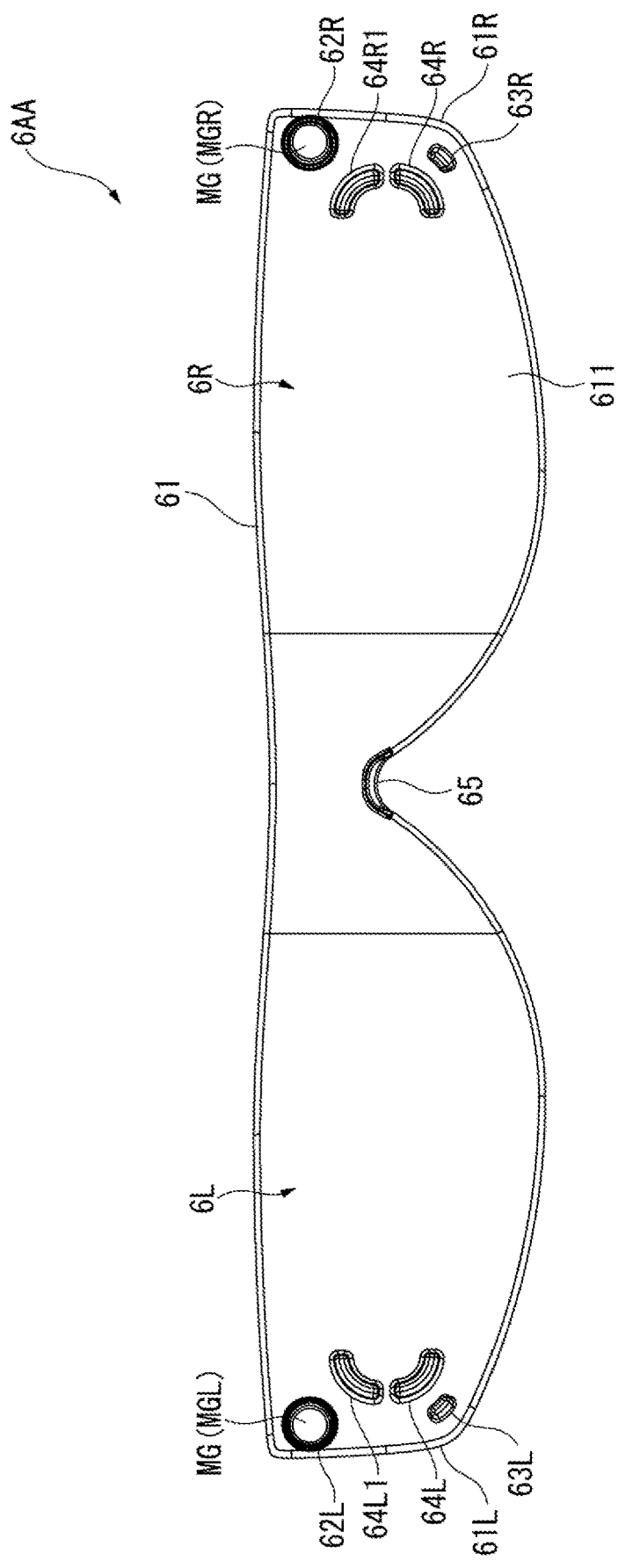
FIG. 15 is a back view illustrating deformation of the cover member in First Exemplary Embodiment.

FIG. 15 is a back view illustrating a cover member 6AA being a modification of the cover member 6A, that is, a plan view illustrating the cover member 6AA as viewed in the −Z direction.

For example, when the cover member 6AA is mounted to the mounting member 43A as illustrated in FIG. 15, the cover member 6AA may include two first protruding portion 64L and 64L1 arranged in the left-side opening 432L formed by the left-side frame portion 433L and two first protruding portions 64R and 64R1 arranged in the right-side opening 432R formed by the right-side frame portion 433R.

More specifically, the cover member 6AA has a similar configuration and function to the cover member 6A except for further including the first protruding portions 64L1 and 64R1 in addition to the first protruding portions 64L and 64R.

The first protruding portion 64L1 is arranged to be capable of abutting the portion in the −X direction and the portion in the +Y direction on the inner end edge of the left-side frame portion 433L when the cover member 6AA is mounted to the mounting member 43A. That is, the first protruding portion 64L1 is provided correspondingly to the corner portion in the −X direction and the +Y direction on the inner end edge of the left-side frame portion 433L.

The first protruding portion 64R1 is arranged to be capable of abutting the portion in the +X direction and the portion in the +Y direction on the inner end edge of the right-side frame portion 433R when the cover member 6AA is mounted to the mounting member 43A. That is, the first protruding portion 64R1 is provided correspondingly to the corner portion in the +X direction and the +Y direction on the inner end edge of the right-side frame portion 433R.

Further, in addition to the first protruding portions 64L and 64R described above the first protruding portions 64L1 and 64R1 abut the inner end edges of the left-side frame portion 433L and the right-side frame portion 433R. According to this, the cover member 6AA along the mounting member 43A is regulated from sliding in the ±X directions and the ±Y directions.

Note that, similar to the first protruding portions 64L, 64R, the protruding dimension of the first protruding portions 64L1 and 64R1 in the −Z direction is set to a dimension that does not come into contact with the left-side light-guiding portion 32L and the right-side light-guiding portion 32R.

With the head-mounted display apparatus 1A including the cover member 6AA described above, similar effects to those of the head-mounted display apparatus 1A including the cover member 6A can be exerted, and at the same time, the following effects can be exerted.

As light-guiding portions, the display unit 3 includes the right-side light-guiding portion 32R provided correspondingly to the right eye of the user and the left-side light-guiding portion 32L provided correspondingly to the left eye of the user. The mounting member 43A includes, as frame portions, the right-side frame portion 433R provided correspondingly to the right-side light-guiding portion 32R and the left-side frame portion 433L provided correspondingly to the left-side light-guiding portion 32L. Among the first protruding portions 64L, 64L1, 64R, and 64R1 of the cover member 6AA, the first protruding portions 64L and 64L1 are provided correspondingly to the two corner portions, which are positioned in the −X direction on a side opposite to the right side frame portion, of the corner portions on the inner end edge of the left-side frame portion 433L, and the first protruding portions 64R and 64R1 are provided correspondingly to the two corner portions, which are positioned in the +X direction on a side opposite to the left-side frame portion 433L, of the corner portions on the inner end edge of the right-side frame portion 433R.

According to this, the four first protruding portions 64L, 64L1, 64R, and 64R1 can regulate slide of the cover member 6AA along the mounting member 43A. Thus, the cover member 6AA can be prevented from coming off the mounting member 43A.

Note that, the first protruding portions 64L, 64L1, 64R, and 64R1 regulate slide of the cover member 6AA along the mounting member 43A, and hence the second protruding portion 65, which abuts the movement regulation portion 434 to regulate slide of the cover member 6AA in the +Y direction, is not required to be provided.

When the cover member 6AA includes the first protruding portions 64L and 64R1, the first protruding portions 64L1 and 64R are not required to be provided. In contrast, when the cover member 6AA includes the first protruding portions 64L1 and 64R, the first protruding portions 64L and 64R1 are not required to be provided.

Moreover, in place of the first protruding portions 64L and 64L1, one first protruding portion obtained by integrating the first protruding portions 64L and 64L1 may be provided, and in place of the first protruding portions 64R and 64R1, one first protruding portion obtained by integrating the first protruding portions 64R and 64R1 may be provided.

Second Exemplary Embodiment

Next, Second Exemplary Embodiment of the present disclosure is described.

A head-mounted display apparatus according to the present exemplary embodiment includes a similar configuration to the head-mounted display apparatus 1A according to First Exemplary Embodiment, but is different from the head-mounted display apparatus 1A in that the head-mounted display apparatus according to the present exemplary embodiment includes a larger number magnets to the mounting member and the cover member. Note that, in the following description, parts that are the same or substantially the same as the matters described above are denoted with the same reference symbols, and description therefor is omitted.

Figure 16:
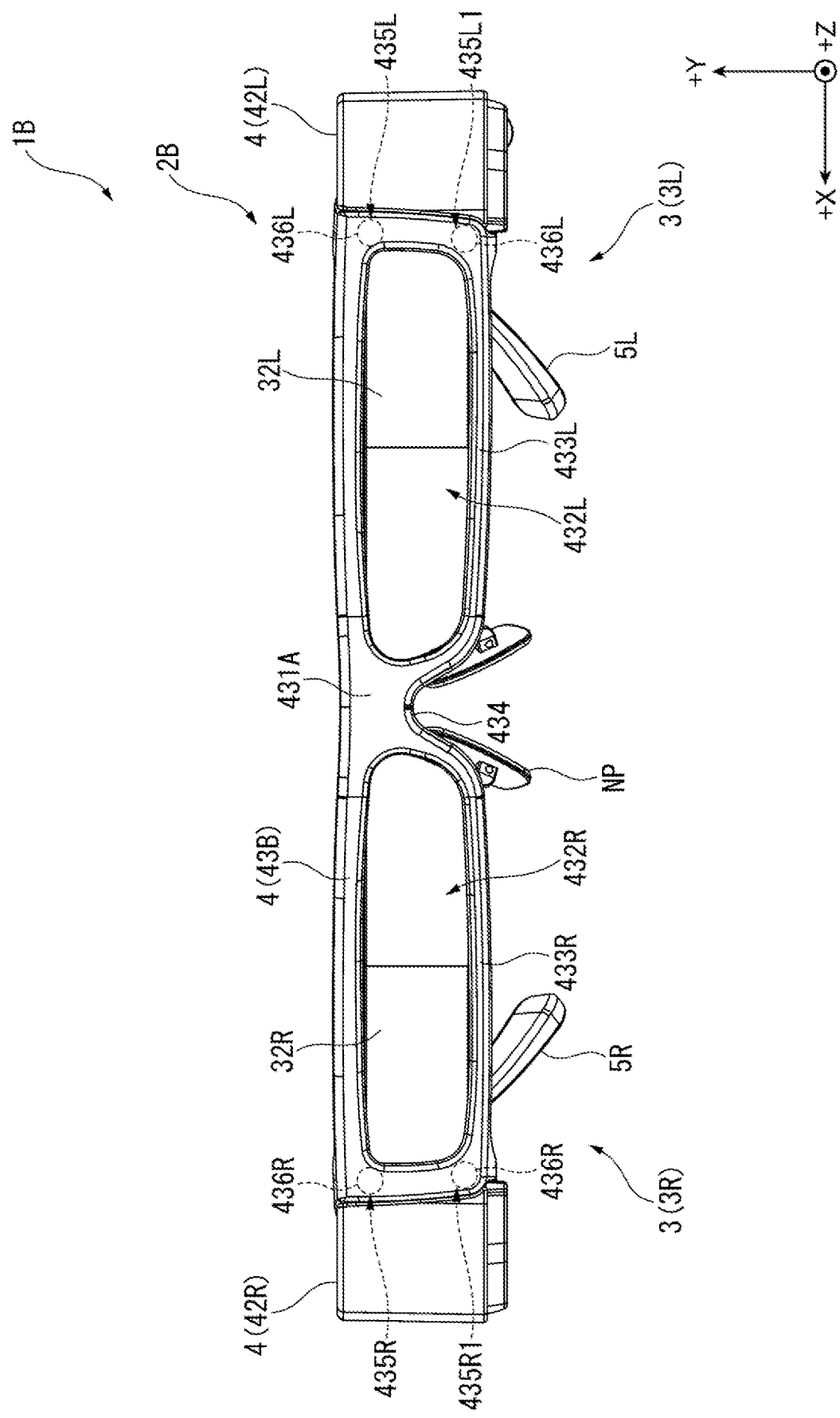
FIG. 16 is a front view illustrating a device main body of a head-mounted display apparatus according to Second Exemplary Embodiment of the present disclosure.
Figure 17:
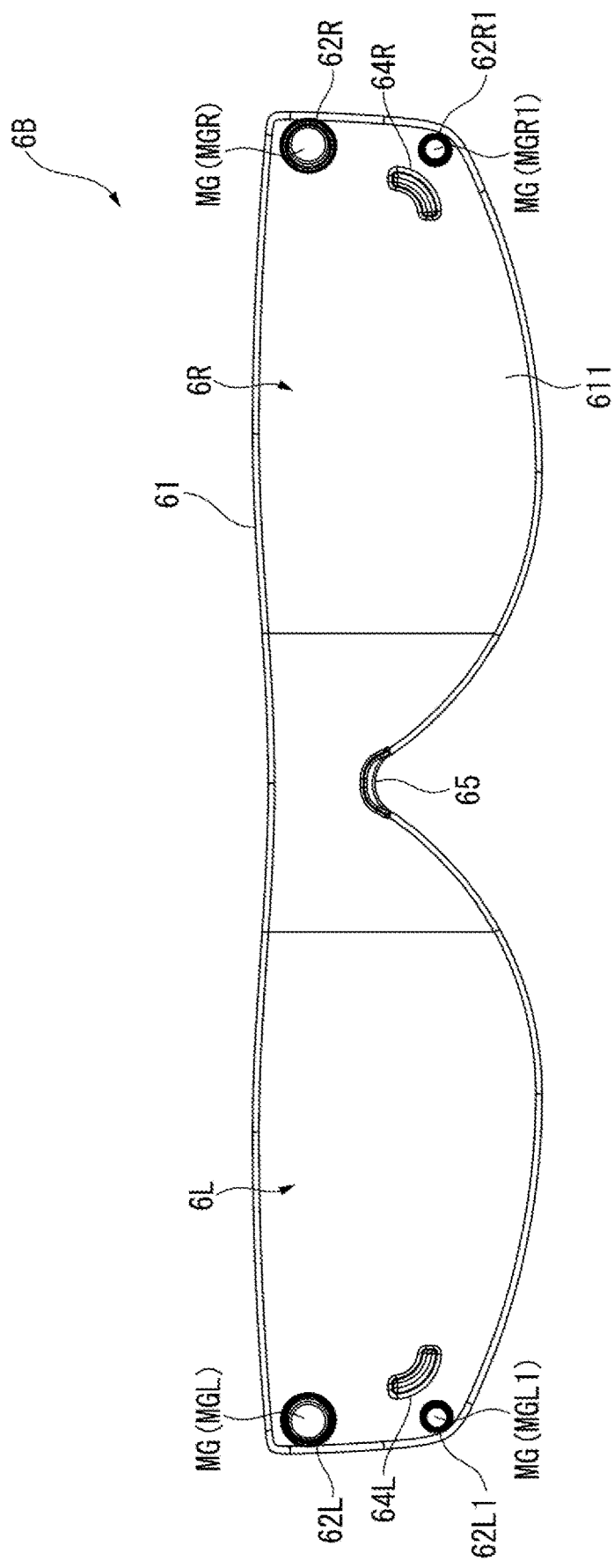
FIG. 17 is a back view illustrating a cover member according to Second Exemplary Embodiment.

FIG. 16 is a front view illustrating a device main body 2B of a head-mounted display apparatus 1B according to the present exemplary embodiment, that is, a plan view illustrating the device main body 2B as viewed in the +Z direction. FIG. 17 is a back view illustrating a cover member 6B, which forms the head-mounted display apparatus 1B and is mounted to the device main body 2B, that is, a plan view illustrating the cover member 6B as viewed in the −Z direction.

Similar to the head-mounted display apparatus 1A, the head-mounted display apparatus 1B according to the present exemplary embodiment is mounted on the head of the user, and displays an image visually recognizable by the user. The head-mounted display apparatus 1B includes the cover member 6B illustrated in FIG. 17 in addition to the device main body 2B illustrated in FIG. 16. Note that, the cover member 6B is described in detail later.

Configuration of Mounting Member

As illustrated in FIG. 16, the device main body 2B has a similar configuration and function to the device main body 2A except for including a mounting member 43B in place of the mounting member 43A.

The mounting member 43B forms the support portion 4 in place of the mounting member 43A, and is fixed to the left-side casing 42L and the right-side casing 42R in a state of covering the frame 41 (see FIG. 1), the left-side light-guiding portion 32L, and the right-side light-guiding portion 32R in the +Z direction. The mounting member 43B has a similar configuration and function to the mounting member 43A except for further including magnetic-force acting portions 435L1 and 435R1.

The magnetic-force acting portion 435L1 is positioned in the −Y direction with respect to the magnetic-force acting portion 435L on the front surface 431A of the main body portion 431. In other words, the magnetic-force acting portion 435L1 is provided in the vicinity of the corner portion in the −X direction and the −Y direction on the left side on the front surface 431A.

The magnetic-force acting portion 435R1 is positioned in the −Y direction with respect to the magnetic-force acting portion 435R on the front surface 431A. In other words, the magnetic-force acting portion 435R1 is provided in the vicinity of the corner portion in the +X direction and the −Y direction on the right side on the front surface 431A.

Although illustration is omitted, similarly to the magnetic-force acting portion 435L, the magnetic-force acting portion 435L1 includes the magnet 436L, an adhesive sheet 437, and a yoke 438, which are provided in a recessed portion formed in the back surface 431B correspondingly to the magnetic-force acting portion 435L1. Similar to the magnetic-force acting portion 435R, the magnetic-force acting portion 435R1 includes the magnet 436R, an adhesive sheet 437, and a yoke 438, which are provided in a recessed portion formed in the back surface 431B correspondingly to the magnetic-force acting portion 435R1.

Configuration of Cover Member

The cover member 6B has a transmission suppression property similar to that of the cover member 6A, and is removably mounted to the front surface 431A of the mounting member 43B by the magnetic force of the magnets 436L and 436R provided to the mounting member 43B. As illustrated in FIG. 17, the cover member 6B further includes contact portions 62L1 and 62R1, and at the same time, has a similar configuration and function to the cover member 6A except for omitting the regulating portions 63L and 63R. In other words, the cover member 6B has a similar configuration and function to the cover member 6A except for including the contact portions 62L1 and 62R1, which are arranged at the positions of the regulating portions 63L and 63R, in place of the regulating portions 63L and 63R.

The contact portion 62L1 is positioned in the −Y direction with respect to the contact portion 62L on the facing surface 611 being the surface of the cover main body 61 in the −Z direction. More specifically, the contact portion 62L1 is provided in the vicinity of the corner portion in the −X direction and the −Y direction on the facing surface 611. The contact portion 62L1 includes the magnet MG (MGL1), and is formed to have a substantially columnar shape similarly to the contact portion 62L.

The contact portion 62R1 is positioned in the −Y direction with respect to the contact portion 62R on the facing surface 611. More specifically, the contact portion 62R1 is provided in the vicinity of the corner portion in the +X direction and the −Y direction on the facing surface 611. The contact portion 62R1 includes the magnet MG (MGR1), and is formed to have a substantially columnar shape similar to the contact portion 62R.

Similar to the magnets MGL and MGR, the magnets MGL1 and MGR1 correspond to a cover-side first magnet and a cover-side second magnet.

The arrangement positions of the magnets MGL1 and MGR1 are the positions of corresponding of the magnets 436L and 436R of the magnetic-force acting portions 435L1 and 435R1 when the cover member 6B is mounted to the mounting member 43B. Further, the magnets MGL, MGL1, MGR, and MGR1 are attracted by the magnets 436L and 436R of the mounting member 43B. According to this, the cover member 6B is mounted to the mounting member 43B and the support portion 4.

In the present exemplary embodiment, the cover member 6B does not include the regulating portions 63L and 63R. This is because the contact portions 62L and 62L1 and the contact portions 62R and 62R1, which are arranged away from each other in the +Y direction, come into contact with the front surface 431A of the mounting member 43B to prevent inclination of the cover member 6B in the −Y direction. However, the cover member 6B is not limited thereto, and may include the regulating portions 63L and 63R.

Effects of Second Exemplary Embodiment

The head-mounted display apparatus 1B according to the present exemplary embodiment described above can exert similar effects to the head-mounted display apparatus 1A according to First Exemplary Embodiment.

Note that, although illustration is omitted, the cover main body 71 of the cover member 7A may include the contact portions 62L1 and 62R1 in place of the regulating portions 63L and 63R, and the cover member including the contact portions 62L1 and 62R1 with the magnets MGL1 and MGR1 may be configured. The head-mounted display apparatus 1B including such cover member in place of the cover member 6B can exert similar effects to the head-mounted display apparatus 1B including the cover member 6B.

Third Embodiment

Next, Third Exemplary Embodiment of the present disclosure will be described.

A head-mounted display apparatus according to the present exemplary embodiment has a similar configuration to the head-mounted display apparatus 1A according to First Exemplary Embodiment. However, in the head-mounted display apparatus according to the present exemplary embodiment, an S-pole region and an N-pole region are provided to the magnets of the mounting member on a surface facing the cover member, and an S-pole region and an N-pole region are provided to the magnets of the cover member on a surface facing the mounting member. The head-mounted display apparatus according to the present exemplary embodiment is different from the head-mounted display apparatus 1A according to First Exemplary Embodiment in this respect. Note that, in the following description, parts that are the same or substantially the same as the matters described above are denoted with the same reference symbols, and description therefor is omitted.

Figure 18:
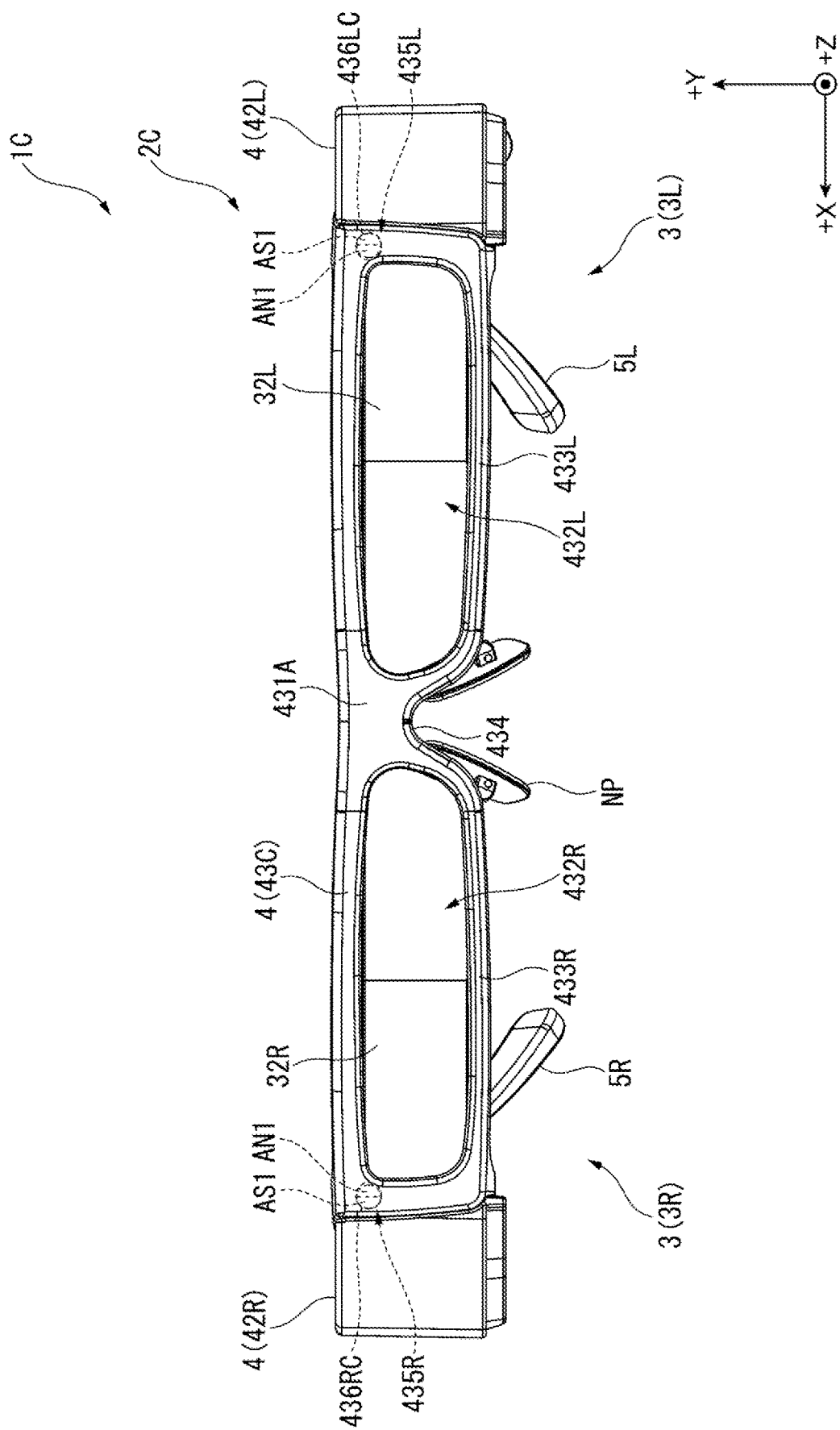
FIG. 18 is a front view illustrating a device main body of a head-mounted display apparatus according to Third Exemplary Embodiment of the present disclosure.
Figure 19:
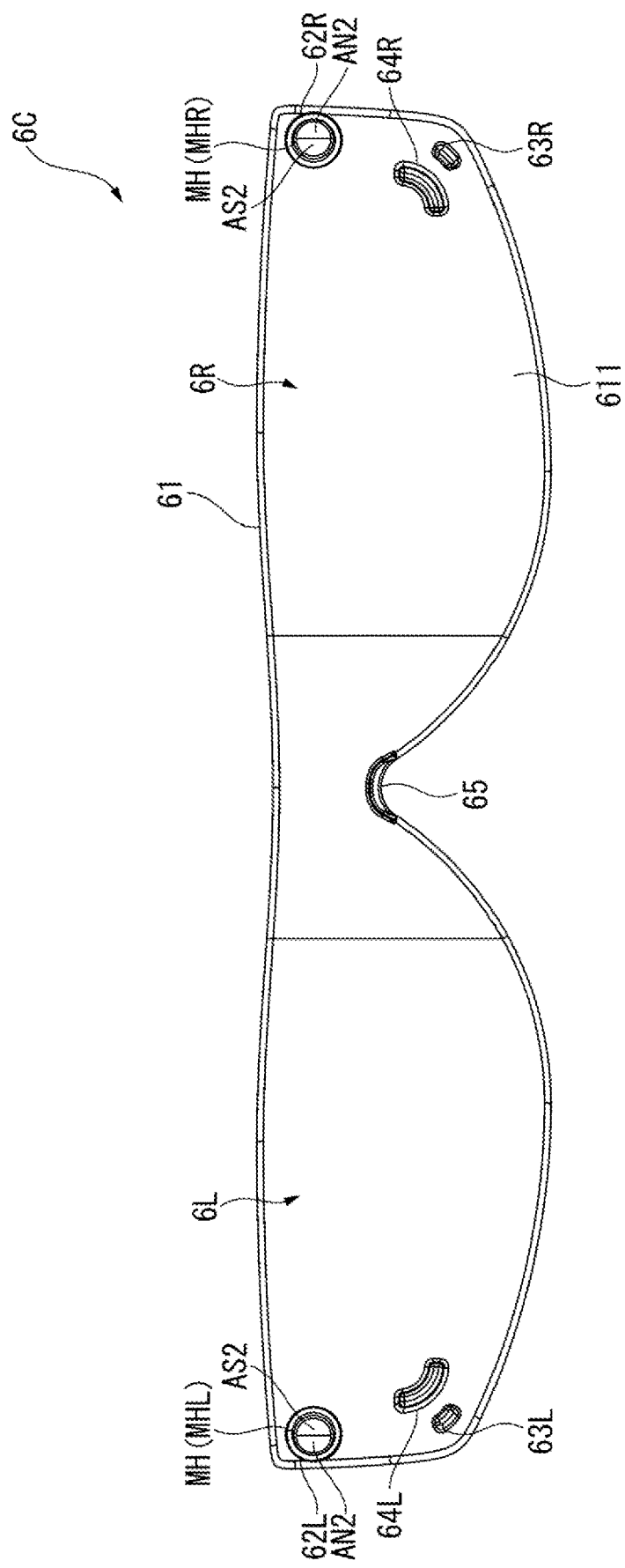
FIG. 19 is a back view illustrating the cover member according to Third Exemplary Embodiment.

FIG. 18 is a front view illustrating a device main body 2C of a head-mounted display apparatus 1C according to the present exemplary embodiment, that is, a plan view illustrating the device main body 2C as viewed in the +Z direction. FIG. 19 is a back view illustrating a cover member 6C which forms the head-mounted display apparatus 1C, that is, a plan view illustrating the cover member 6C as viewed in the −Z direction.

Similar to the head-mounted display apparatuses 1A and 1B, the head-mounted display apparatus 1C according to the present exemplary embodiment is used by being mounted on the head of the user, and displays an image visually recognized by the user. The head-mounted display apparatus 1C includes the device main body 2C illustrated in FIG. 18 and the cover member 6C illustrated in FIG. 19. Note that, the cover member 6C is described in detail later.

Configuration of Device Main Body

As illustrated in FIG. 18, the device main body 2C has a similar configuration and function to the device main body 2A except for including a mounting member 43C in place of the mounting member 43A. That is, the device main body 2C includes the display unit 3, the support portion 4, and the temple portions 5L and 5R, and the support portion 4 includes the frame 41, which supports the left-side light-guiding portion 32L and the right-side light-guiding portion 32R, the left-side casing 42L and the right-side casing 42R, which are fixed to the frame 41 and store the left-side emitting unit 31L and the right-side emitting unit 31R, and the mounting member 43C.

Configuration of Mounting Member

Similar to the mounting member 43A, the mounting member 43C is fixed to the left-side casing 42L and the right-side casing 42R in a state of covering the frame 41, the left-side light-guiding portion 32L, and the right-side light-guiding portion 32R in the +Z direction. The mounting member 43C has a similar configuration and function to the mounting member 43A except for including magnets 436LC and 436RC in place of the magnets 436L and 436R. That is, the magnetic-force acting portion 435L of the mounting member 43C includes the magnet 436LC in place of the magnet 436L, and the magnetic-force acting portion 435R includes the magnet 436RC in place of the magnet 436R. The magnets 436LC and 436RC correspond to a support portion-side first magnet and a support portion-side second magnet, and correspond to support portion-side magnets.

The magnet 436LC has an N-pole region AN1 and an S-pole region AS1 being regions with different poles on the surface in the +Z direction, which faces the cover member 6C. The magnet 436RC is similarly configured.

In the present exemplary embodiment, in each of the magnets 436LC and 436RC, the N-pole region AN1 is positioned on the center side of the mounting member 43C in the +X direction, and the S-pole region AS1 is positioned on the outer side of the mounting member 43C. However, the N-pole region AN1 and the S-pole region AS1 are not limited thereto, and may be, for example, arranged in a manner opposite to the above. Further, for example, in the magnets 436LC and 436RC, one of the N-pole region AN1 and the S-pole region AS1 may be positioned in the +X direction, and the other may be positioned in the −X direction. Moreover, in each of the magnets 436LC and 436RC, one of the N-pole region AN1 and the S-pole region AS1 may be positioned in the +Y direction, and the other may be positioned in the −Y direction. The arrangement of the N-pole region AN1 and the S-pole region AS1 may differ depending on the magnets 436LC and 436RC. That is, the arrangement of the N-pole region AN1 and the S-pole region AS1 may be changed as appropriate in the magnets 436LC and 436RC.

Configuration of Cover Member

As illustrated in FIG. 19, the cover member 6C has a similar configuration and function to the cover member 6A except for including magnets MH (MHL and MHR) in place of the magnets MG (MGL and MGR). The magnets MHL and MHR correspond to a cover-side first magnet and a cover-side second magnet, and correspond to cover-side magnets.

Similar to the magnets 436LC and 436RC, each of the magnets MHL and MHR includes an N-pole region AN2 and s S-pole region AS2 with different poles on the surface in the −Z direction, the surface facing the mounting member 43C.

The N-pole region AN2 of the magnet MHL is set and arranged correspondingly to the S-pole region AS1 of the magnet 436LC, and the S-pole region AS2 of the magnet MHL is set and arranged correspondingly to the N-pole region AN1 of the magnet 436LC.

Similarly, the N-pole region AN2 and the S-pole region AS2 of the magnet MHR are set and arranged correspondingly to the S-pole region AS1 and the N-pole region AN1 of the magnet 436RC.

Effects of Third Exemplary Embodiment

The head-mounted display apparatus 1C according to the present exemplary embodiment described above can exert similar effects to the head-mounted display apparatus 1A illustrated in First Exemplary Embodiment, and can also exert the following effects.

The mounting member 43C includes the magnets 436LC and 436RC as support portion-side magnets, each of which includes the N-pole region AN1 and the S-pole region AS1 with different poles on the surface facing the cover member 6C. The cover member 6C includes the magnets MHL and MHR as cover-side magnets, each of which includes the N-pole region AN2 and the S-pole region AS2 corresponding to poles of the magnets 436LC and 436RC on the surface facing the mounting member 43C.

According to this, when the cover member 6C is about to slide along the mounting member 43C, the N-pole region AN1 and the S-pole region AS1 in each of the magnets 436LC and 436RC and the N-pole region AN2 and the S-pole region AS2 in each of the magnets MHL and MHR repel each other, and the cover member 6C is caused to return to the original position. According to this, slide and shift of the cover member 6C can be prevented.

Note that, the cover member 7A in which the magnets MHL and MHR are adopted in place of the magnets MGL and MGR can also exert similar effects.

Modifications of Exemplary Embodiments

The present disclosure is not limited to the exemplary embodiments described above, and the present disclosure includes variations, improvements, and the like within the scope in which the object of the present disclosure can be accomplished.

In the exemplary embodiments described above, the mounting members 43A to 43C include the magnets 436L, 436R, 436LC, and 436RC, and the cover members 6A to 6C, 6AA, and 7A include the magnets MG and MH. However, the present disclosure is not limited thereto. One of the mounting member and the cover member may include the magnets, and the other may include a magnetic material such as metal attracted by the magnets.

In the exemplary embodiments described above, the magnet MGL is arranged in the contact portion 62L, and the magnet MGR is arranged in the contact portion 62R. The magnet MGL1 is arranged in the contact portion 62L1, and the magnet MGR1 is arranged in the contact portion 62R1. Moreover, the magnet MHL is arranged in the contact portion 62L, and the magnet MHR is arranged in the contact portion 62R. However, the magnets included in the cover member may not be arranged in the contact portions that come into contact with the support portion in the cover member, and the magnets may be arranged at positions away from the contact portion. That is, it is only required that the magnets included in the cover member be arranged in the magnetic field of the magnets included by the support portion, and that the magnets included by the support portion be arranged in the magnetic field of the magnets included in the cover member. Thus, for example, the magnets MG and MH may be embedded in the cover main body of the cover member. Note that, also in this case, the magnets included in one of the mounting member and the cover member may be a magnetic body.

In the exemplary embodiments described above, the mounting members 43A to 43C are fixed to the left-side casing 42L and the right-side casing 42R to which both the ends of the frame 41 in the +X direction are attached, so as to cover the frame 41, the left-side light-guiding portion 32L, and the right-side light-guiding portion 32R in the +Z direction. However, the present disclosure is not limited thereto. The mounting members 43A to 43C and the frame 41 may be integrated. The fixing positions of the mounting members 43A to 43C may not be in the left-side casing 42L and the right-side casing 42R.

In the exemplary embodiments described above, in the mounting members 43A to 43C, the magnets 436L, 436R, 436LC, and 436RC are arranged at the positions in the vicinities of the corner portions of the front surface 431A, and in the cover members 6A to 6C, 6AA, and 7A, the magnets MG and MH are arranged at the positions in the vicinities of the corner portions of the facing surface 611. However, the present disclosure is not limited thereto. The arrangement positions of those magnets can be changed as appropriate as long as the magnets of the mounting member and the magnets of the cover member are provided at the corresponding positions. For example, the magnets may be provided at the center of the mounting member in the +X direction, and the magnets attracted by the magnets may be provided at the center of the cover member in the +X direction. Note that, also in this case, the magnets included in one of the mounting member and the cover member may be a magnetic body.

In the exemplary embodiments described above, the cover members 6A to 6C, 6AA, and 7A has a transmission suppression property that suppresses transmission of incident light. However, the entire cover member is not required to have a transmission suppression property. For example, only the cover main body 61 may have a transmission suppression property, and only regions of the cover main body 61, which correspond to the left-side light-guiding portion 32L and the right-side light-guiding portion 32R as viewed in the +Z direction, may have a transmission suppression property.

Moreover, the cover members 6A to 6C, 6AA, and 7A may have a non-transmission property that does not allow incident light to substantially transmit, or may have a transmission property that allows substantially all incident light to transmit.

In addition, the cover members 6A to 6C, 6AA, and 7A may have other properties. For example, the cover member according to the present disclosure may have a wavelength selective property that allows light having a predetermined wavelength to transmit and blocks light with other wavelengths, among the incident light. The cover member according to the present disclosure may have a polarization property that allows a predetermined polarized light to transmit and blocks other polarized light. The cover member according to the present disclosure may be colored with a predetermined color on an incident surface that outside light enters.

In the exemplary embodiments described above, the first protruding portions 64L and 64L1 are arranged at the corner portions on the inner end edge of the left-side frame portion 433L so as to be capable of abutting the two portions intersecting each other on the inner end edge of the left-side frame portion 433L. Similarly, the first protruding portions 64R and 64R1 are arranged at the corner portions on the inner end edge of the right-side frame portion 433R so as to be capable of abutting the two portions intersecting each other on the inner end edge of the right-side frame portion 433R. However, the present disclosure is not limited thereto. The first protruding portions may be arranged so as to be capable of abutting a part of the left-side frame portion 433L and a part of the inner end edge of the right-side frame portion 433R. That is, the first protruding portions may be arranged so as to be capable of abutting one peripheral edge extending in the +X direction or the −Y direction on the inner end edge of the corresponding frame portion. A large number of first protruding portions may be provided to the cover member.

Moreover, the portions of the mounting member into which the first protruding portions of the cover member are inserted may not be the left-side frame portion 433L and the right-side frame portion 433R that surround portions on which images are displayed in the left-side light-guiding portion 32L and the right-side light-guiding portion 32R, may be recessed portions additionally provided.

The shape of the left-side opening 432L formed by the left-side frame portion 433L and the shape of the right-side opening 432R formed by the right-side frame portion 433R, that is, the shape of the inner end edge of the left-side frame portion 433L and the inner end edge of the right-side frame portion 433R as viewed in the +Z direction may not be a substantially rectangular shape, and may be a circular shape including an oval and a polygonal shape other than a rectangular shape. Further, the outer shape of the left-side frame portion 433L may be a shape corresponding to the outer shape of the left-side light-guiding portion 32L as viewed in the +Z direction. The outer shape of the right-side frame portion 433R may be a shape corresponding to the outer shape of the right-side light-guiding portion 32R in the +Z direction. That is, the inner shape and the outer shape of the frame portion as viewed in the +Z direction may be changed as appropriate, and the first protruding portion is only required to come into contact with the inner end edge of the corresponding frame portion. For example, the first protruding portion inserted into the left-side frame portion 433L is provided so as to be capable of abutting the inner end edge of the left-side frame portion 433L in the −X direction and the inner end edge of at least one of the +Y direction and the −Y direction, and the first protruding portion inserted into the right-side frame portion 433R is provided so as to be capable of abutting the inner end edge of the right-side frame portion 433R in the +X direction and the inner end edge of the +Y direction or the −Y direction. According to this, slide of the cover member in the ±X directions and slide of the cover member in at least one of the +Y direction and the −Y direction can be regulated.

Meanwhile, as described above, the one first protruding portion obtained by integrating the first protruding portions 64L and 64L1 may be provided, and the one first protruding portion obtained by integrating the first protruding portions 64R and 64R1 may be provided.

In the exemplary embodiments described above, the distal end of each of the first protruding portions 64L, 64L1, 64R, and 64R1 in the −Z direction is such dimension that does not abut the left-side light-guiding portion 32L and the right-side light-guiding portion 32R. The cover members 6A, 6AA, 6C, and 7A include the regulating portions 63L and 63R that regulate the first protruding portions 64L, 64L1, 64R, and 64R1 from coming into contact the left-side light-guiding portion 32L and the right-side light-guiding portion 32R. However, the present disclosure is not limited thereto. The first protruding portions 64L, 64L1, 64R, and 64R1 may come into contact the left-side light-guiding portion 32L and the right-side light-guiding portion 32R unless guiding of light by the left-side light-guiding portion 32L and the right-side light-guiding portion 32R is hindered.

In the exemplary embodiments described above, the mounting members 43A to 43C include the yoke 438 that controls the direction of the magnetic flux of the magnets 436L, 436R, 436LC, and 436RC. However, the present disclosure is not limited thereto, and the yoke 438 may be omitted. The cover member may include the yoke.

In the exemplary embodiments described above, in the cover members 6A to 6C, 6AA, and 7A, the left-side regions 6L and 7L covering the left-side light-guiding portion 32L in the +Z direction and the right-side regions 6R and 7R covering the right-side light-guiding portion 32R in the +Z direction cross with each other, and the crossing angle α formed by those regions is less than 170 degrees. However, the present disclosure is not limited thereto. The crossing angle α may be changed as appropriate, and the main body portion of the cover member may be a flat surface on which the left-side region and the right-side region are continuous.

In the exemplary embodiments described above, the fixing portion 439L is provided to the vicinity of the end of the mounting members 43A to 43C in the −X direction, and the fixing portion 439R is provided in the vicinity of the end of the mounting members 43A to 43C in the +X direction. However, the present disclosure is not limited thereto. The fixing portions that fix the mounting members 43A to 43C to the frame 41 may be provided at other positions. For example, the fixing portions may be provided at positions of being fitted into the attaching portion 411, which are arranged positions of the frame 41 between the left-side light-guiding portion 32L and the right-side light-guiding portion 32R. That is, the fixing portions may have a similar function to the movement regulation portion 434 that abuts the second protruding portions of the cover member to regulate slide of the cover member.

In First Exemplary Embodiment described above, the magnet 436L and the magnet 436R have different magnetic poles on the surface facing the cover members 6A and 7A. In other words, the magnet MGL and the magnet MGR have different magnetic poles on the surface facing the mounting member 43A. However, the present disclosure is not limited thereto. The magnets 436L and 436R have the same magnetic pole on the surface facing the cover members 6A and 7A, and the magnets MGL and MGR have the same magnetic pole on the surface facing the mounting member 43A. In the magnets MGL, MGL1, MGR, and MGR1 of the cover member 6B according to Second Exemplary Embodiment described above, the magnetic poles on the surface facing the mounting member 43B may differ at random. Further, for example, among the magnets MGL, MGL1, MGR, and MGR1, the magnets MGR and MGR1 positioned in the +X direction and the magnets MGL and MGL1 positioned in the −X direction may have different magnetic poles on the surface facing the mounting member 43B. The magnets MGL and MGR positioned in the +Y direction and the magnets MGL1 and MGR1 positioned in the −Y direction may have different magnetic poles on the surface facing the mounting member 43B. Further, for example, the two magnets MGL and MGR1 on one diagonal line of the cover member 6B and the two magnets MGR and MGL1 on the other diagonal line may have different magnetic poles on the surface facing the mounting member 43B. The cover member 7A further including the magnets MGL1 and MGR1 is similarly configured.

Moreover, in the mounting member 43B in the second exemplary embodiment described above, the magnets 436LC and 436RC may be adopted in place of the magnets 436L and 436R. In the cover member 6B, the magnet MH may be adopted in place of the magnet MG. Similarly, in the mounting member 43A in First Exemplary Embodiment described above, the magnets 436LC and 436RC may be adopted in place of the magnets 436L and 436R. In the cover member 6AA, the magnet MH may be adopted in place of the magnet MG.

In addition, in the magnets 436LC and 436RC and the magnets MHL and MHR, the positions and orientations of the N-pole region and the S-pole region may be changed as appropriate as long as the arrangement allows the corresponding magnets attract each other.

That is, in the magnets included in the head-mounted display apparatus according to each of the exemplary embodiments described above, the number, the shape, the orientations of magnetic poles, the magnetic field strength, the magnetic flux density, and the arrangement of the S-pole region and the N-pole region may be changed as appropriate, and may be combined as appropriate.

In the exemplary embodiments described above, the display unit 3 includes the left-side display unit 3L configured to display the left-eye image by causing the left-eye image light to enter the left eye of the user, and the right-side display unit 3R configured to display the right-eye image by causing the right-eye image light to enter the right eye of the user. However, the present disclosure is not limited thereto. One of the left-side display unit 3L and the right-side display unit 3R may be omitted.

What is claimed is:

1. A head-mounted display apparatus to be mounted on a head of a user, the head-mounted display apparatus comprising:

a display unit configured to display an image by emitting image light in a first direction to a predetermined viewing position;

a support portion configured to support the display unit; and a cover member that is positioned with respect to the display unit in a direction opposite to the first direction and that is removably provided to the support portion, wherein:

the cover member includes:

a contact portion that is positioned on a facing surface facing the support portion and that comes into contact with the support portion and a first protruding portion that is positioned on the facing surface and that protrudes toward the support portion and away from the facing surface, the first protruding portion being configured to be inserted into the support portion such that an outer surface of the first protruding portion abuts an inner edge of the support portion, at least one of the cover member and the support portion includes a magnet that attracts the other one of the cover member and the support portion by a magnetic force, the contact portion and the first protruding portion are provided on an inner side with respect to an outer edge of the cover member when the cover member is viewed from the direction opposite to the first direction, the display unit includes:

an image emitting unit configured to emit the image light, and a light-guiding portion configured to guide the image light emitted by the image emitting unit to the viewing position, the support portion includes a frame portion positioned on a cover member side with respect to the light-guiding portion and surrounding a display position of the image formed by the image light guided by the light-guiding portion, and the first protruding portion is arranged to be configured to abut an inner end edge of the frame portion, the light-guiding portion includes:

a right-side light-guiding portion provided correspondingly to a right eye of the user and a left-side light-guiding portion provided correspondingly to a left eye of the user, the frame portion includes:

a right-side frame portion provided correspondingly to the right-side light-guiding portion and a left-side frame portion provided correspondingly to the left-side light-guiding portion, the cover member includes a second protruding portion that is provided on an inner side with respect to an outer edge of the cover member when the cover member is viewed from the direction opposite to the first direction and that is configured to abut a portion between the right-side frame portion and the left-side frame portion, and the first protruding portion is provided correspondingly to one of two corner portions, positioned on a side opposite to the left-side frame portion, among corner portions of an inner end edge of the right-side frame portion and to one of two corner portions, positioned on a side opposite to the right-side frame portion, among corner portions of an inner end edge of the left-side frame portion.

2. The head-mounted display apparatus according to claim 1, wherein
the first protruding portion is arranged to be configured to abut two portions of the inner end edge of the frame portion, the portions intersecting each other.

3. The head-mounted display apparatus according to claim 1, wherein
the first protruding portion has a protruding dimension that prevents contact with the light-guiding portion.

4. The head-mounted display apparatus according to claim 1, wherein
the cover member includes a restriction portion that is positioned, on the facing surface, on an arrangement side of the first protruding portion with respect to the contact portion and that comes into contact with the support portion to restrict the first protruding portion from coming into contact with the light-guiding portion.

5. The head-mounted display apparatus according to claim 1, wherein
the light-guiding portion includes
a right-side light-guiding portion provided correspondingly to a right eye of the user and
a left-side light-guiding portion provided correspondingly to a left eye of the user,
the frame portion includes
a right-side frame portion provided correspondingly to the right-side light-guiding portion and
a left-side frame portion provided correspondingly to the left-side light-guiding portion, and
the first protruding portion is provided correspondingly to two corner portions, positioned on a side opposite to the left-side frame portion, among corner portions of an inner end edge of the right-side frame portion and to two corner portions, positioned on a side opposite to the right-side frame portion, among corner portions of an inner end edge of the left-side frame portion.

6. The head-mounted display apparatus according to claim 1, wherein
the light-guiding portion has a transmission property of transmitting incident light from a side of the cover member that covers the light-guiding portion and
the cover member has a transmission suppression property of suppressing transmission of incident light.

7. The head-mounted display apparatus according to claim 1, wherein
the support portion includes a support portion-side first magnet and a support portion-side
second magnet provided separate from each other,
the cover member includes
a cover-side first magnet that attracts and is attracted to the support portion-side first magnet and
a cover-side second magnet that attracts and is attracted to the support portion-side second magnet, and
a magnetic pole on a surface, facing the cover member, of the support portion-side first magnet and a magnetic pole on a surface, facing the cover member, of the support portion-side second magnet are different from each other.

8. The head-mounted display apparatus according to claim 1, wherein the support portion includes support-portion side magnets respectively including, on respective surfaces thereof facing the cover member, regions with different magnetic poles and
the cover member includes cover-side magnets respectively including regions corresponding to magnetic poles of support portion-side magnets.

9. The head-mounted display apparatus according to claim 1, wherein
the support portion includes
the magnet and
a yoke configured to intensify an attracting force by the magnetic force.

10. The head-mounted display apparatus according to claim 1, wherein
the cover member includes
a right-side region corresponding to a right eye of the user and
a left-side region corresponding to a left eye of the user, and
the right-side region and the left-side region incline to a support portion side as distanced away from each other.

11. The head-mounted display apparatus according to claim 10, wherein
a crossing angle formed by the right-side region and the left-side region is less than 170 degrees.

12. A cover member removably provided to a support portion of a head-mounted display apparatus including the support portion to which a display unit configured to display an image in a first direction by emitting image light is provided, the cover member comprising:
a contact portion configured to come into contact with the support portion;
a first protruding portion that protrudes toward the support portion and away from a facing surface, the first protruding portion being configured to be inserted into the support portion such that an outer surface of the first protruding portion abuts an inner edge of the support portion; and
any one of a magnet attracting the support portion by a magnetic force and a magnetic body attracted to the support portion by a magnetic force, wherein:
the contact portion and the first protruding portion are provided on an inner side with respect to an outer edge of the cover member when the cover member is viewed from a side opposite to a side on which the display unit emits the image light,
the display unit includes:
an image emitting unit configured to emit the image light, and
a light-guiding portion configured to guide the image light emitted by the image emitting unit to the viewing position,
the support portion includes a frame portion positioned on a cover member side with respect to the light-guiding portion and surrounding a display position of the image formed by the image light guided by the light-guiding portion, and
the first protruding portion is arranged to be configured to abut an inner end edge of the frame portion,
the light-guiding portion includes:
a right-side light-guiding portion provided correspondingly to a right eye of a user and
a left-side light-guiding portion provided correspondingly to a left eye of the user,
the frame portion includes:

a right-side frame portion provided correspondingly to the right-side light-guiding portion and a left-side frame portion provided correspondingly to the left-side light-guiding portion, the cover member includes a second protruding portion that is provided on an inner side with respect to an outer edge of the cover member when the cover member is viewed from a direction opposite to the first direction and that is configured to abut a portion between the right-side frame portion and the left-side frame portion, and the first protruding portion is provided correspondingly to one of two corner portions, positioned on a side opposite to the left-side frame portion, among corner portions of an inner end edge of the right-side frame portion and to one of two corner portions, positioned on a side opposite to the right-side frame portion, among corner portions of an inner end edge of the left-side frame portion.

* * * * *